US011849304B2

(12) United States Patent
Buck et al.

(10) Patent No.: US 11,849,304 B2
(45) Date of Patent: *Dec. 19, 2023

(54) USE OF GEOLOCATION TO IMPROVE SECURITY WHILE PROTECTING PRIVACY

(71) Applicant: Lookout Inc., San Francisco, CA (US)

(72) Inventors: Brian James Buck, Livermore, CA (US); Jeroen Martijn Wijdogen, Hilversum (NL); Kevin Lam, San Francisco, CA (US); Varun Shimoga Prakash, Fremont, CA (US); Michael Joseph Mole, Milton, MA (US); Pradeep Deepak Phatak, Fremont, CA (US); Praveen Kumar Mamnani, Mountain View, CA (US)

(73) Assignee: LOOKOUT INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,304

(22) Filed: Nov. 3, 2022

(65) Prior Publication Data

US 2023/0056369 A1     Feb. 23, 2023

Related U.S. Application Data

(63) Continuation of application No. 16/782,907, filed on Feb. 5, 2020, now Pat. No. 11,523,282.

(51) Int. Cl.
*H04W 12/37* (2021.01)
*G06F 21/60* (2013.01)
*H04W 12/02* (2009.01)

(52) U.S. Cl.
CPC .......... *H04W 12/37* (2021.01); *G06F 21/604* (2013.01); *H04W 12/02* (2013.01)

(58) Field of Classification Search
CPC ..... H04W 12/02; H04W 12/37; H04W 88/02; H04W 12/08; H04W 12/088; H04W 12/63; G06F 21/604; H04L 63/107; H04L 63/20

(Continued)

(56) References Cited

U.S. PATENT DOCUMENTS 8,112,785 B1 *   2/2012   Cooley ................. H04W 12/37
                                                           342/450
8,504,481 B2 *   8/2013   Motahari ............... G06Q 10/10
                                                           706/3

(Continued)

*Primary Examiner* — Kambiz Zand
*Assistant Examiner* — Aubrey H Wyszynski
(74) *Attorney, Agent, or Firm* — David R. Stevens; Stevens Law Group

(57) ABSTRACT

Security policies are made dependent on location of a device and the location of a device is determined and the appropriate security policy applied without providing the device's location to a server. A device determine its location and identifies a security policy identifier mapped to a zone including the location. The device requests the security policy corresponding to the identifier from a server and implements it. The device may also store a database of the security policies and implement them according to its location. Devices registered for a user evaluate whether locations detected for the devices correspond to impossible travel by the user. Objects encoding geolocation data of a device may be encrypted with a private key of the device and the public key of another to prevent access by an intermediary server.

15 Claims, 13 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 8,781,500 B1* | 7/2014 | Dekel | ............... | H04M 1/72457 |
| | | | | 455/412.2 |
| 9,179,316 B2* | 11/2015 | Raleigh | ................. | H04W 12/00 |
| 9,467,474 B2* | 10/2016 | Barton | ................. | H04L 63/205 |
| 10,757,538 B1* | 8/2020 | Stammers | ............ | H04W 12/08 |
| 11,272,443 B2* | 3/2022 | Milchtaich | ........... | H04W 12/37 |
| 2004/0123150 A1* | 6/2004 | Wright | ................... | G06F 21/32 |
| | | | | 726/1 |
| 2005/0055578 A1* | 3/2005 | Wright | ................... | G06F 21/32 |
| | | | | 726/4 |
| 2006/0075472 A1* | 4/2006 | Sanda | .................... | H04L 67/14 |
| | | | | 726/1 |
| 2006/0089938 A1* | 4/2006 | Leonard | ............... | H04L 41/00 |
| 2006/0095953 A1* | 5/2006 | Frank | ................. | H04L 63/0861 |
| | | | | 713/176 |
| 2009/0049518 A1* | 2/2009 | Roman | .................. | H04L 67/34 |
| | | | | 726/1 |
| 2010/0081417 A1* | 4/2010 | Hickie | ................. | G06F 21/604 |
| | | | | 455/414.1 |
| 2010/0146583 A1* | 6/2010 | Prehofer | ................ | G06Q 30/02 |
| | | | | 726/1 |
| 2012/0106738 A1* | 5/2012 | Belenkiy | ................... | H04L 9/14 |
| | | | | 380/270 |
| 2012/0159172 A1* | 6/2012 | Saxena | ................ | H04L 63/107 |
| | | | | 713/176 |
| 2013/0029641 A1* | 1/2013 | Hickie | ................ | H04W 12/088 |
| | | | | 455/410 |
| 2013/0215740 A1* | 8/2013 | Tse | ...................... | H04L 41/0816 |
| | | | | 370/255 |
| 2014/0040979 A1* | 2/2014 | Barton | .................. | H04W 12/30 |
| | | | | 726/1 |
| 2014/0045524 A1* | 2/2014 | Nilsson | ............... | G06F 21/6245 |
| | | | | 455/456.1 |
| 2014/0289821 A1* | 9/2014 | Wilson | ............... | G06Q 20/3278 |
| | | | | 726/5 |
| 2015/0326613 A1* | 11/2015 | Devarajan | ............... | H04L 63/20 |
| | | | | 726/1 |
| 2015/0339461 A1* | 11/2015 | Min | ...................... | H04W 12/03 |
| | | | | 726/28 |
| 2017/0041296 A1* | 2/2017 | Ford | ....................... | G06F 21/64 |
| 2021/0014676 A1* | 1/2021 | Silverstein | ............ | H04W 4/029 |
| 2021/0357091 A1* | 11/2021 | Allen | ................. | G01C 21/3667 |
| 2022/0050919 A1* | 2/2022 | Childress | ............... | G06F 21/84 |

* cited by examiner

USE OF GEOLOCATION TO IMPROVE SECURITY WHILE PROTECTING PRIVACY

RELATED APPLICATIONS

This application is a continuation of U.S. patent application Ser. No. 16/782,907, filed Feb. 5, 2020.

BACKGROUND

In a modern enterprise, there is a wide array of devices in use by members of the enterprise, all of which may store or generate sensitive data. It is in the interest of the enterprise to protect the security of its data on each device on which it may be found. However, some devices may also be used for personal matters by a member of the enterprise or while the member of the enterprise is conducting personal matters. In some industries, employee union, and worker counsel contracts or other regulations do not permit the employers to track the location of employee's device in general or while the employees are outside working hours.

Accordingly, there is a need to balance the need for security with protection of privacy.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
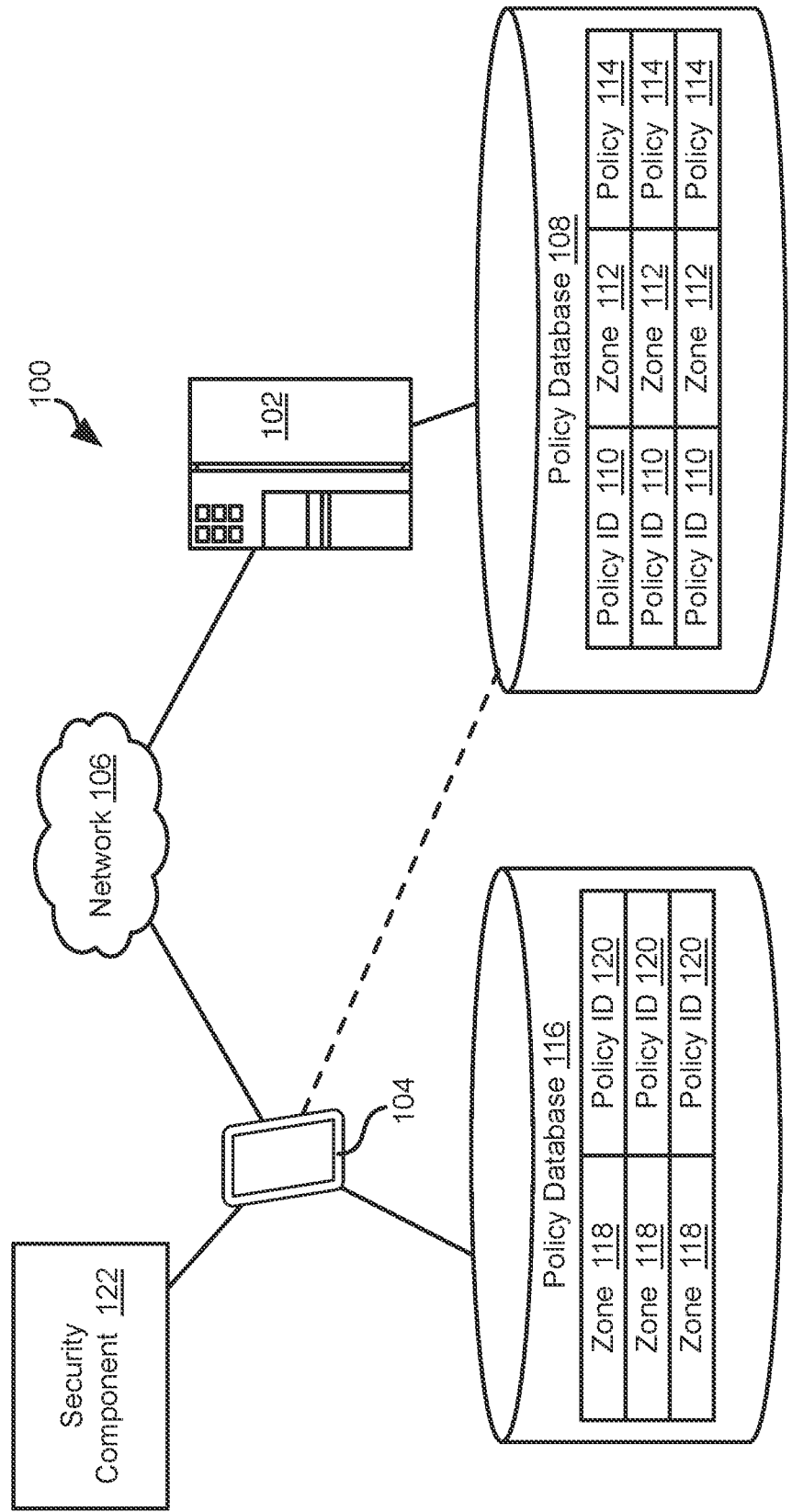
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Objective-C, Swift, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, an enterprise may desire to have different security policies depending on geolocation of a device. For example, a security policy can refer to parameters or requirements for authentications performed from that device, or can refer to a policy for what services can be accessed and/or with what permissions. In one example, the enterprise may have some or all of: a first security policy when the device or user of the device in an enterprise office location; a second security policy when the device or user of the device is at the device user's home; a third security policy when the device or user of the device is traveling between the home and the enterprise office location; a fourth security policy when the device or user of the device is on business travel; a fifth security policy when the device or user of the device is on vacation or is outside normal working hours; and a sixth security policy when the device or user of the device is determined to be in risky locations, e.g., certain countries or cities or other geographic regions.

One possible approach to determining the device's location is sending actual location data from the device to an enterprise server which invades the privacy of the device user (this information can be used to track the user's location). Alternatively, an IP geolocation service can be used by an enterprise server to estimate the user's location. Such services often return incorrect information or very approximate location. The usage of VPN (virtual private network) services will return an incorrect location for the actual device and user. Additionally, it is possible on many devices for a user to install an app which spoofs the actual device geolocation; an enterprise will want to base its geolocation-related policy decisions upon the real device location, not a spoofed geolocation.

The systems and methods disclosed herein provide an approach for implementing geo-location-based security policies while preserving the privacy of the user of the device and ensuring the accuracy of the actual geolocation used. For example, a network environment 100 may include a server system 102 that includes one or more computers. The server system 102 may be a security server system 102. For example, the server system 102 may be an Identity Access Management (IAM) server, or a device management server (such as an MDM (mobile device management) server or an EMM (enterprise mobility management) server.

Members of the enterprise use various devices 104 that may be embodied as mobile phones, tablet computers, laptop computers, desktop computers, wearable computers, or other computing devices. The systems and methods disclosed herein are particularly applicable where at least a portion of the devices 104 are mobile and can be expected to change location over time. The mobile devices 104 may execute a mobile operating system such as IOS, ANDROID, or the like. The user devices 104 may also be desktop computers or other server computers executing an operating system such as MACOS, WINDOWS, LINUX, or the like.

An individual user may use multiple different devices 104. The devices 104 and server system may communicate with one another over a network 106 including some or all of a wired local area network (LAN), wireless LAN, the Internet, or other network.

The server system 102 may host or access a policy database 108. The database may include a plurality of entries each having a policy identifier 110 and defining one or more zones 112 associated with that policy identifier. For example, the zone 112, may be as small as an office or building and be defined by boundaries of the office or building or as a connection to a local network of that office or building, or it can be a region. In at least one embodiment, the zone is a corporate perimeter. The zone 112 may be a user's home, i.e. the building footprint or lot boundaries of the user's home. The zone 112 may include the boundaries of a city, county, state, country, island, or continent. The boundaries of the zone 112 may be defined using any approach for implementing geofencing, such as by a series of global positioning system (GPS) coordinates defining the boundary of the zone. For example, the conflict of the enterprise's policy to monitor employee information on work premises which conflicts with a union policy (that does not allow employee monitoring outside the work premises) can be resolved using the geographic location of the device by implementing the enterprise policy only when the employee is in the enterprise zone (worksite).

For example, the zone 112 may be defined using any of the approaches described below (or a combination of the approaches described below):

A GPS/latitude & longitude location from a GPS element on a device

An altitude determination from a sensor on a device, e.g., a barometric altitude determination, or an altitude measurement from a GPS element on a device A geofence specification like a point and radius or a polygon or other area specification or a specification that optionally includes altitude, e.g., "floors 26 through 28 of a building at this location."

A geofence specified as a street address with a radius or with an area definition (e.g., polygon) around that main point (e.g., building walls). This may include altitude specifications as well.

A beacon identifier and signal strength or distance, such as a BLE (BLUETOOTH low energy) beacon, or other.

A beacon identifier and a distance, e.g., via precision ranging information using Wi-Fi beacons and/or Fine Timing Measurement (FTM) protocol. In at least some embodiments, the distance can be measured using Wi-Fi beacons and/or Fine Timing Measurement (FTM) protocol which is derived from one of the IEEE 802.15.4, IEEE 802.11-2016, and/or 802.11.4 r4 standards (which can be accurate to within a meter). In some embodiments, the Angle of Arrival (AoA) and/or Angle of Departure (AoD) protocols associated with the Bluetooth standard can be used to determine the location of the device.

Wi-Fi access points as beacons with RSS (received signal strength) as a determination of distance; multiple may be used to further refine a device's location.

Cell towers as beacons with RSS used as determination of distance; multiple towers and their RSS may be used to further refine location; with 5G technology very precise location determinations are possible.

A list of allowed countries or states or counties or cities or other named geographic regions or zones.

A list of NOT allowed countries or states or counties or cities or other named geographic regions or zones.

A list of categories of locations that are allowed (e.g., a business location, or a store, or a movie theater, or a coffee shop, or a restaurant or bar, or a residence, or inside a building, or outside a building, or in a vehicle, etc.)

A list of categories of locations that are NOT allowed (e.g., a business location, or a store, or a movie theater, or a coffee shop, or a restaurant or bar, or a residence, or inside a building, or outside a building, or in a vehicle, etc.)

A determination that the location is a new location, that is, a location which has not previously been visited by this particular device 104, or by the particular user of this device 104 from any device (the enterprise may need a different security policy for a new location detected for a device or a user; this is based on a location history stored securely on the device and accessible only to a security component 122 on the device 104)

A determination that the location is an infrequent location, that is, a location which has not previously been frequently visited by this particular device 104, or by the particular user of this device 104 from any device (the enterprise may need a different security policy for an infrequent location detected for a device or a user; this is based on a location history stored securely on the device 104 and accessible only to the security component 122 on the device 104), A determination that the location is a frequent location, that is, a location which has previously been frequently visited by this particular device 104, or by the particular user of this device 104 from any device (the enterprise may need a different security policy for a frequent location detected for a device or a user; this is based on a location history stored securely on the device 104 and accessible only to the security component 122 on the device 104), A determination that the location is near a line between frequent locations (e.g., a location that might represent travel by the device or user between frequent locations, where such frequent locations are within a distance threshold apart), that is, a location which is "in between" locations which have been frequently visited by this particular device, or by the particular user of this device 104 from any device (the enterprise may need a different security policy for travel between frequent locations detected for a device or a user; this is based on a location history stored securely on the device and accessible only to the security component 122 on the device 104), A determination that the location for the device while it is in motion, e.g., in land vehicular motion, or water vehicular motion, or aerial vehicular motion, or other motion such as walking or running or biking. The enterprise may need a different security policy for devices in motion.

In the event that a geolocation cannot be determined (e.g., inside a building with no GPS available, or no RF beacons (Wi-Fi or BLE) available, then the security component 122 can use the most recently obtained geolocation, or, in an embodiment, use inertial navigation calculations from the most recently observed geolocation or geolocation trajectory. E.g., using a device's 104 step counter, and gyroscope sensor readings, the direction and magnitude of motion from a known geolocation can be estimated, e.g., assuming a range of about 0.6 m to 1.1 m per step.

Each entry may further include a security policy 114 that is to be implemented when the device 104 is found within the zone or zone 112 of the entry. Note that in some embodiments, a single entry may define multiple zones (e.g., regions) 112, i.e. the device 104 will be subject to the security policy 114 when in any of the multiple zones 112 of the entry.

A security policy 114 may specify required parameters for authentications that are performed from a device 104, such as no biometrics requirements, a biometric requirement, a multiple biometric requirement, requiring a physical 2FA (two factor authentication) security key, and/or requiring other parameters.

A security policy 114 may specify the operation of security component(s) on a device 104. A security policy 114 may specify certain configurations or settings on a device 104. A security policy 114 may specify which applications can be run, which off-device services can be accessed, which networks can be accessed (can be based on attributes of network connections), which sensors or capabilities of a device can or cannot be used (such as a device camera or microphone or speaker (audio output) or cellular modem/communications, or Wi-Fi communications or Bluetooth communications, or any other radio usage), and/or which websites can or cannot be accessed by the device 104. In at least one embodiment, the security policy can be prefetched to the device based on information associated with the user of the device such as travel plans based on a calendar associated with the user or device, travel tickets, or email correspondence. For example, in response to a user purchasing a ticket to country A, the security policy associated with country A can be fetched to the one or more devices associated with the user.

A security policy 114 may include conditions to be tested or checked, and corresponding actions to be taken, which actions can include one or more of:
notifying a user of the device,
notifying a server,
notifying an administrator of the device, blocking an application from launching or running or from continuing to run if already executing, uninstalling an application, updating or replacing a component (e.g., encryption module) or setting (e.g., update encryption level) of an app, a plurality of apps, operating system, etc., completely blocking network access by an application, service, or web browser, blocking network access by an application, service, or web browser to specific network destinations or to all but specific network destinations, blocking a specific type of network access by any application, service, or web browser, such as blocking cellular access (including 4G, 5G, etc.), or blocking Wi-Fi, or blocking Bluetooth, or any other specific RF/radio communications, blocking a specific device input or output capability, such as use of a camera, or a microphone, or a speaker or other audio output, or a device vibration motor or other haptic component, changing a setting or configuration on the device, allowing or disallowing access to a particular service or services, e.g., enterprise services, which could include terminating an existing session with a particular service or services, other security related actions on the device 104, and one or more procedural or declarative policy specifications (e.g., if unsafe network then perform action A, if malware detected then perform action B, etc.), or other procedural or declarative forms of policy specification.

A device 104 may host a local policy database 116 that includes entries including a zone (e.g., region) 118 and a policy identifier 120 associated with that zone (e.g., region). As discussed below, the device 104 may use the policy database 116 to determine a policy identifier 120 mapped to a zone in which the device 104 is located without sharing its location with the server system 102. The device 104 may then coordinate with the server system 102 to implement the policy 114 mapped to the policy identifier 120 in the database 108 that matches the policy identifier 110. The policy database 116 may be transmitted by the server system 102 to the devices 104. The database 116 may also be periodically updated by the serve 102 or be periodically retransmitted. The security component 122 may be programmed to periodically request the database 116. The security component 122 may be a security application on the device 104, a trusted application executing within a trusted execution environment (TEE), a component of the operating system, a component of a trusted operating system executing in a TEE, a component of a browser, or a component executing on a device's baseband processor or FGPA.

In some embodiments, when there is no pre-configured geolocation zone for different policies, a geolocation policy engine within the security component 122 with access to the policy database 116 can be configured to receive an identity of the device 104 and/or a user on the device 104, and an actual geolocation of the device 104. The geolocation policy engine may then respond with what the policy should be for that device 104 and or user in that specific geolocation. To prevent the geolocation policy engine from being able to track the device and/or user's geolocation in response the device or user initiating an attempt to access a service (e.g., request a decision by the privacy policy, change in device or user geolocation, requirement to reevaluate geolocation policy), the device 104 (preferably via a proxy) can send a request for a geolocation policy decision to the policy engine. In some embodiments, the request can be an anonymous request. In some embodiments, to avoid a geolocation privacy leak, the device 104 (e.g., the security component 122), can send several such requests, each with a different geolocation. Such geolocation may be random choices from a set of historical locations for the device (said history stored on device or possibly within the privacy preserving proxy), and/or coarser geolocation. A coarser geolocation can be a lower precision aka larger area, or random interpolations among historical locations, or historical geolocation of other users if available, but also includes the actual current geolocation of the device or user. The request response can contain multiple geolocation security policies; the requesting device can select and enforce the one which corresponds to the actual geolocation. The geolocation policy engine, admin console, data store, or STEM (security information and event management) server can be notified when/if a new policy or set of policies are sent to, enforced, or selected on a device. In at least one embodiment, the user of the device can be notified about the new policy or set of policies are sent to, enforced, or selected on a device.

Figure 2A:
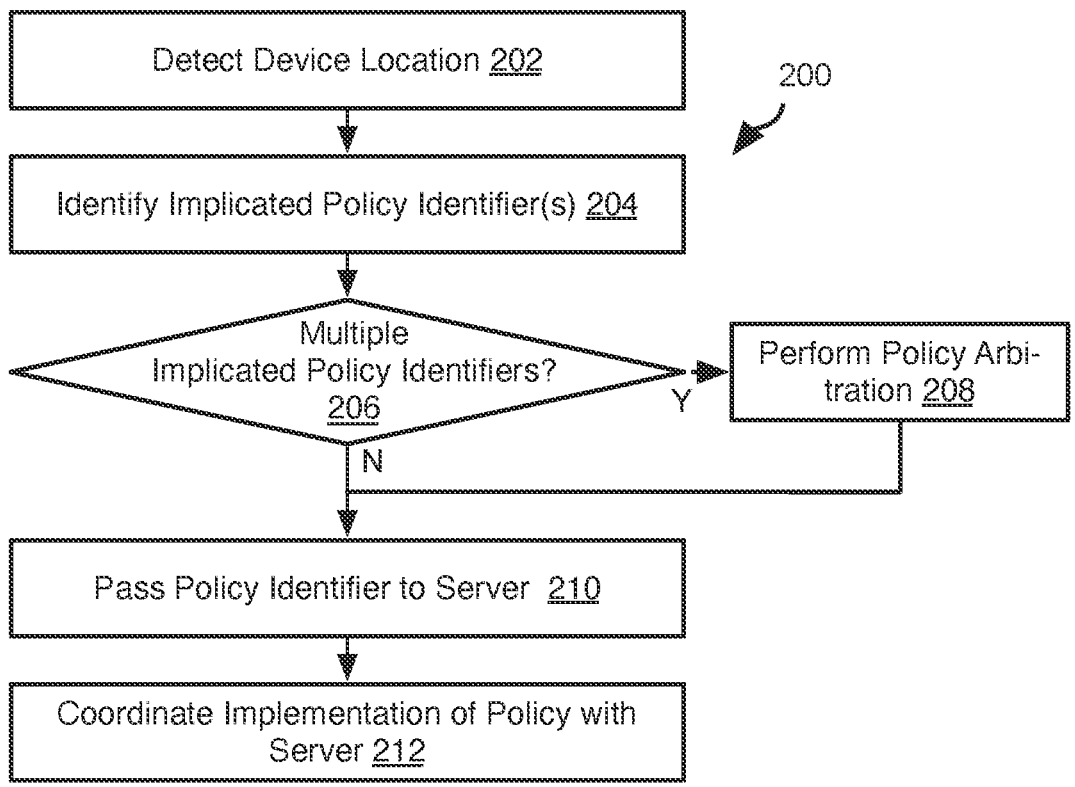
FIGS. 2A and 2B are process flow diagrams of methods for implementing a location-based security policy while preserving privacy in accordance with an embodiment of the present invention.

FIG. 2A illustrates a method 200 that may be executed by an enterprise using the network environment 100. In particular, the method 200 may be executed by executable code executing on a device 104 of a user. Performance of the method 200 may be triggered by an event on the device 104 of the user or on the server system 102. For example, a security component executing on the device 104 may be triggered to execute the method 200 by an event such as an operating system startup or the occurrence of a security event. Examples of security events include the launch of an application; a change in network state; a screen lock or unlock event; a sensor event such as a calculation on the output of an accelerometer, gyroscope, magnetometer, photo sensor, or proximity sensor; a geographic location change; an authentication event, such as a FIDO (fast identity online) authentication or a SAML (security assertion markup language) or OpenID Connect sign-on on a website, application login; or other security event. In some embodiments, the security component may request the database 116 in response to the triggering event in preparation for executing the method 200.

The method 200 may include detecting 202 the location of the device 104. Detecting 202 the location may be performed by:

A GPS/latitude & longitude location from a GPS element on the device 104

An altitude determination from a sensor on the device 104, e.g., a barometric altitude determination, or an altitude measurement from a GPS element on a device A beacon identifier and signal strength or distance, such as a BLE (BLUETOOTH low energy) beacon or an 802.15.4 ranging process from another device or beacon, or other detecting using a receiver of the device 104. Wi-Fi beacons and/or Fine Timing Measurement (FTM) protocol which is derived from a IEEE 802.15.4, IEEE 802.11-2016, and/or 802.11.4 r4 standards (which can be accurate to within a meter) can also be used to determine location. In some embodiments, the Angle of Arrival (AoA) and/or Angle of Departure (AoD) protocols associated with the Bluetooth standard can be used to determine the location of the device.

Detecting Wi-Fi access points as beacons with a receiver of the device 104 and using RSS as a determination of distance; multiple Wi-Fi access points may be used to further refine the location of the device 104.

Detecting cell towers as beacons with a receiver of the device 104 with RSS used as determination of distance;

multiple towers and their RSS may be used to further refine the location of the device 104.

In some embodiments, the geolocation can be obfuscated by a proxy. When it is determined that the device location is obfuscated by a proxy, the location can be requested from the proxy. In at least one embodiment, the request to the proxy can require authentication.

In the event that a geolocation cannot be determined using any of the above-approaches, such as due to the device 104*a*, 104*b* being located within a building, then the security component 122 can use a location determined using some or all of the following approaches:

using a most recent previously-obtained geolocation using inertial navigation calculations from the most recently observed geolocation or geolocation trajectory, e.g., using a device's step counter (e.g., assume X meters per step, where X is a typical stride of a person or a measured typical stride of the user), accelerometer, compass, and/or gyroscope sensor readings to estimate the direction and magnitude of motion from a known geolocation.

The method 200 may further include identifying 204 one or more policy identifiers implicated by the location determined at step 202. In particular, step 204 may include evaluating the policy database 116 stored on the device 104 in order to identify one or more zones 118 that include the location from step 202, i.e. include the location within a polygon defining a geofence, within a specified radius from a reference point, within a city, state, country or other region, within range of a BLE beacon, Wi-Fi access point, or cell tower defining a zone 118, or otherwise meeting the specification of a zone 118.

Note that multiple zones 118 may be identified at step 204. This is possible for a variety of reasons, including that some zones 118 may be of different sizes and overlapping in area. If this is found 206 to be true, the method 200 may include performing 208 policy arbitration. Arbitration may be performed according to rules such as one or more of:

The policy identifiers may be arranged in a predefined order and the zones 118 evaluated with respect to the location from step 202 in this order. The security policy identifier 120 of the first entry to include the location in its zone 118 is selected for processing according to subsequent steps.

The policy identifier 120 of the smallest identified zone 118 may be selected. The determination as to which geographic zone is the smallest can be done using the geometric parameters of the geographic zone 118, or can be alternatively done based on an a priori defined priority of different types of geographic zone specifications (e.g., "country" is less specific than "city" is less specific than a geofence defined by a point and a radius, is less specific than a polygonal geofence, etc.). Alternatively, there may be a relative size value associated with each geographic zone in the collection, and the device 104 selects the security policy identifier corresponding to the smallest relative size value.

The policy identifier 120 corresponding to the most restrictive security policy will be selected (restrictiveness may be a field in each entry in the policy database 116 enabling this comparison).

A combination of the security policies of the implicated policy identifiers 120 will be implemented such that the most restrictive elements of the security policies are used, e.g., where a first security policy permits an action and the second policy forbids the action, the second policy will be implemented to forbid the action.

In another example, where the first security policy requires performing of an action (e.g., more secure authentication) and the second security policy does not require performing that action, the first security policy will be implemented to perform the action. Note that performing this option will be part of the subsequent step 212 in which the security policy is implemented.

In the event that there is no matching zone 118, then a default security policy identifier 120 may be selected, where the default security policy identifier is predefined for use in the absence of a matching zone 118.

The method 200 may include passing 210 one or more policy identifiers to the server system 102. If there is a single zone 118 identified, it will be the policy identifier 120 mapped to that zone. If there are multiple zones 118, it will be either (a) a single policy identifier 120 selected according to the arbitration of step 208 or (b) multiple policy identifiers 120 that are to be implicated in combination as described above. Note that the server used to implement the security policy may be the same as or different from the server from which the database 116 was received.

The device 104 may then coordinate with the server system 102 to implement 212 the security policy 114 corresponding to the policy identifier 120 or identifiers 120. Step 212 may be performed using a security component executing on the device 104. For example, the server system 102 may transmit parameters defining the security policy 114 to the device 104, which will then implement the security policy (see the description of a security policy 114 above to see examples of actions that may be implemented). Actions required of the server system 102, such as participating in authentication or implementing restrictions, may also be performed at step 212.

Figure 2B:
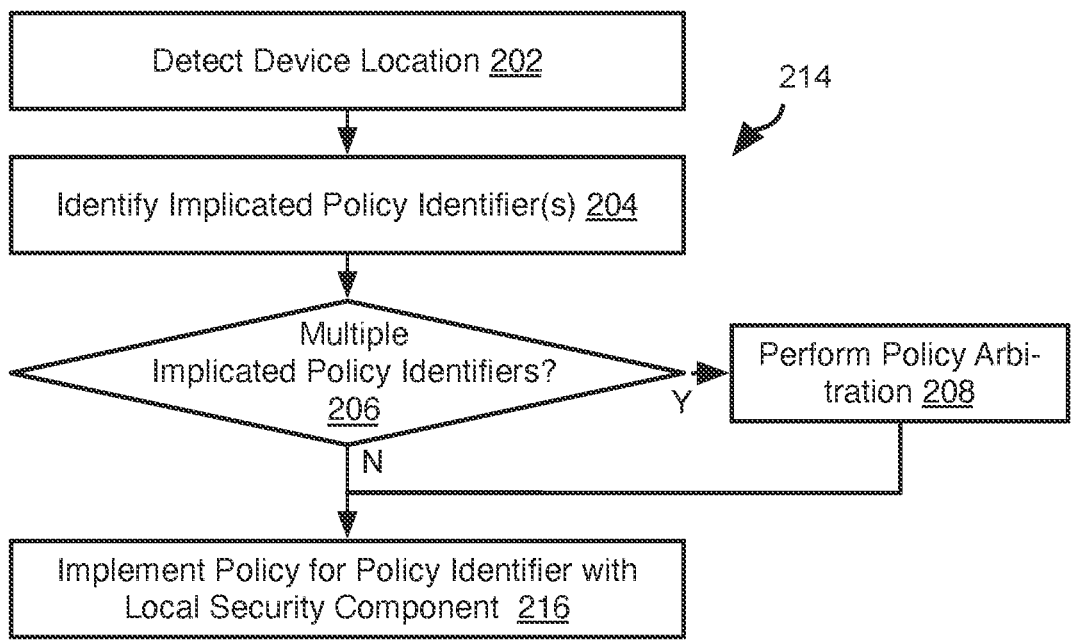

Referring to FIG. 2B, in an alternative method 214, the method as described with respect to FIG. 2A is performed except that step 212 is replaced with step 216, in which the device 104, implements the security policy 114 or security policies 114 using parameters defining the security policies 114 stored on the device 104 itself. For example, the policy database 108, or a portion thereof, may be stored on the device 104, enabling the device 104 to implement the security policy 114 for an identified zone 118 without the server system 102. This has the advantage of avoiding transmitting a security policy identifier 120 to the server system 102, which might permit inference of the location of the device 104. For example, in some instances, each zone 118 may have a unique corresponding security policy identifier 120 such that the location of the device 104 can be known with certainty. In such embodiments, zones 118 may be mapped directly to security policies 114 without the use of security policy identifiers 120.

In some embodiments of the method 214, the security component on the device 104 may send a message to the server system 102 when a selected security policy identifier 120 is different from the previously active security policy identifier 120. However which security policy identifiers 120 were the old and new ones are not sent to the server system 102 in order to preserve the privacy of the user. The Enterprise is assured that the device is running the appropriate security policy from the database 108 for the device's current geolocation, but does not invade the privacy of the user by having access to the precise geolocation of the device the user is using.

In at least one embodiment, contextual or behavioral information (i.e., biometrics, walk gait, hand movement, typing biometrics, etc.) can be used when determining the appropriate geolocation policy to be applied. For example, a first US policy can be applied when a device is in the United States and the behavioral information indicates certainty that the user handling the device is the owner of the device, while second US policy can be applied when the device is in the United States and the behavioral information associated with the device does not match that of the device owner. Behavioral information can include biometric measures which indicate there may have been a change in user on a device or an unusual number of failed authentication attempts or other behavior unusual for the customary user who is logged into the device.

In some embodiments, the device 104 reports to a server (a location policy engine or other policy engine, or an enterprise console or a data store or a STEM or other such server), such as the server system 102, which policy or policy settings are in use/in force/being enforced. In some embodiments, a server or network appliance or network access point, such as the server system 102, may issue a request to all devices 104 reachable in an area requesting a response as to whether each device is actively enforcing an appropriate security policy for the device. The security component 122 on each device 104 so requested responds with a yes or a no answer, cryptographically signed by the security component 122 on the device 104 so that the requestor can determine that it has received a valid response from an executing security component on the device. Devices 104 that are detected but which have not responded with a yes answer can be reported to an administrator or server, and can be restricted with regard to their network connectivity, in order to facilitate the enterprise's discovery of devices in the area which are not enforcing the enterprise's appropriate security policy.

Figure 3:
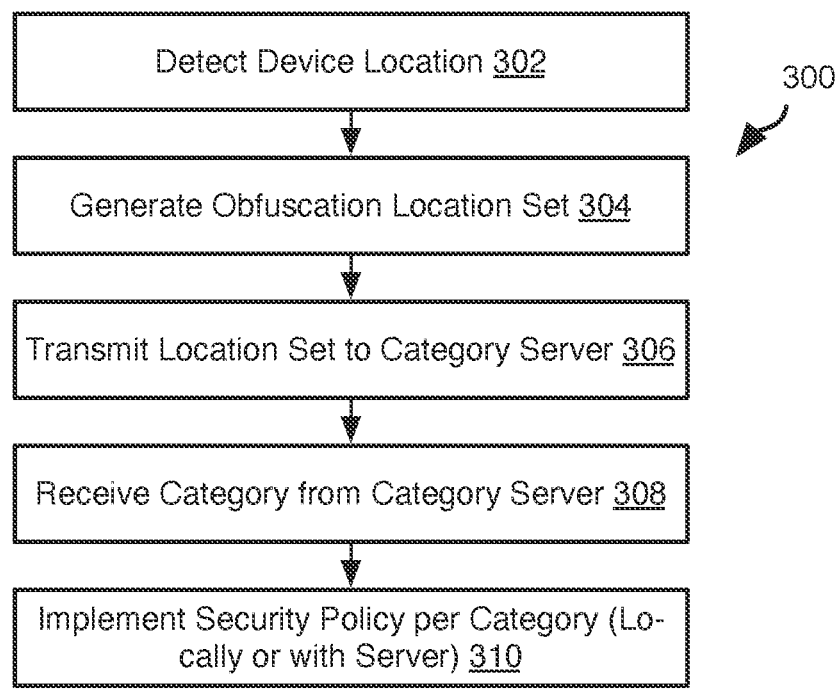
FIG. 3 is a process flow diagram of a method for implementing a location category-based security policy while preserving privacy in accordance with an embodiment of the present invention.

FIG. 3 illustrates an alternative method 300 that may be executed by a device 104, such as a security component executing on the device 104, in order to implement a location-based security policy. The method 300 may include detecting 302 the location of the device 104, such as in the same manner as for step 202 of the method 200.

The method 300 may include generating 304 an obfuscation location set. In particular, in order to disguise the actual location of the device 104, a set of random locations may be generated. For example, scattered about the same city as the device 104 or in various cities around the device 104. The locations in the obfuscation location set may be represented as a location (e.g. address or GPS coordinate), a radius about a location, or a sequence of locations representing a trajectory of movement. A category of a location represents some attributes about what is at a location, e.g., a business location, a store, a movie theater, a coffee shop, a restaurant, bar, a residence, inside a building, outside a building, in a vehicle, etc. There may be more than one category corresponding to a particular location. In some embodiments, a proxy can be used to the IP based geolocation from any server or geolocation policy engine. The proxy can be a dedicated server or a VPN (virtual private network) server or a CASB (cloud access security broker). The proxy can be configured so that the obfuscated location will be configured to the IP address of the proxy and not the IP address of the device.

The method 300 may include transmitting 306 the obfuscation location set, including the device location from step 302, to a category server. The category server may be an anonymous server, i.e. not requiring authentication to access, separate from the server system 102 and return, for each location in the obfuscation location set, a category for that location. The category indicates a degree of risk associated with the location and correlates to a security policy for that degree of risk.

The device 104 then receives 308 the categories from the category server and implements 310 the security policy mapped to the category assigned to the location from step 302 in the obfuscation set. Other categories for other locations of the obfuscation set may be ignored. For example, the device 104 may store a database of security policies, each security policy being mapped to one or more categories. The device 104 therefore receives the category for the location from step 302, identifies the security policy (security policy 114 or security policy identifier 120) mapped to it, and implements 310 the security policy. Implementing 310 may be performed in the manner described above with respect to either of step 212 and step 216 as described above.

Figure 4:
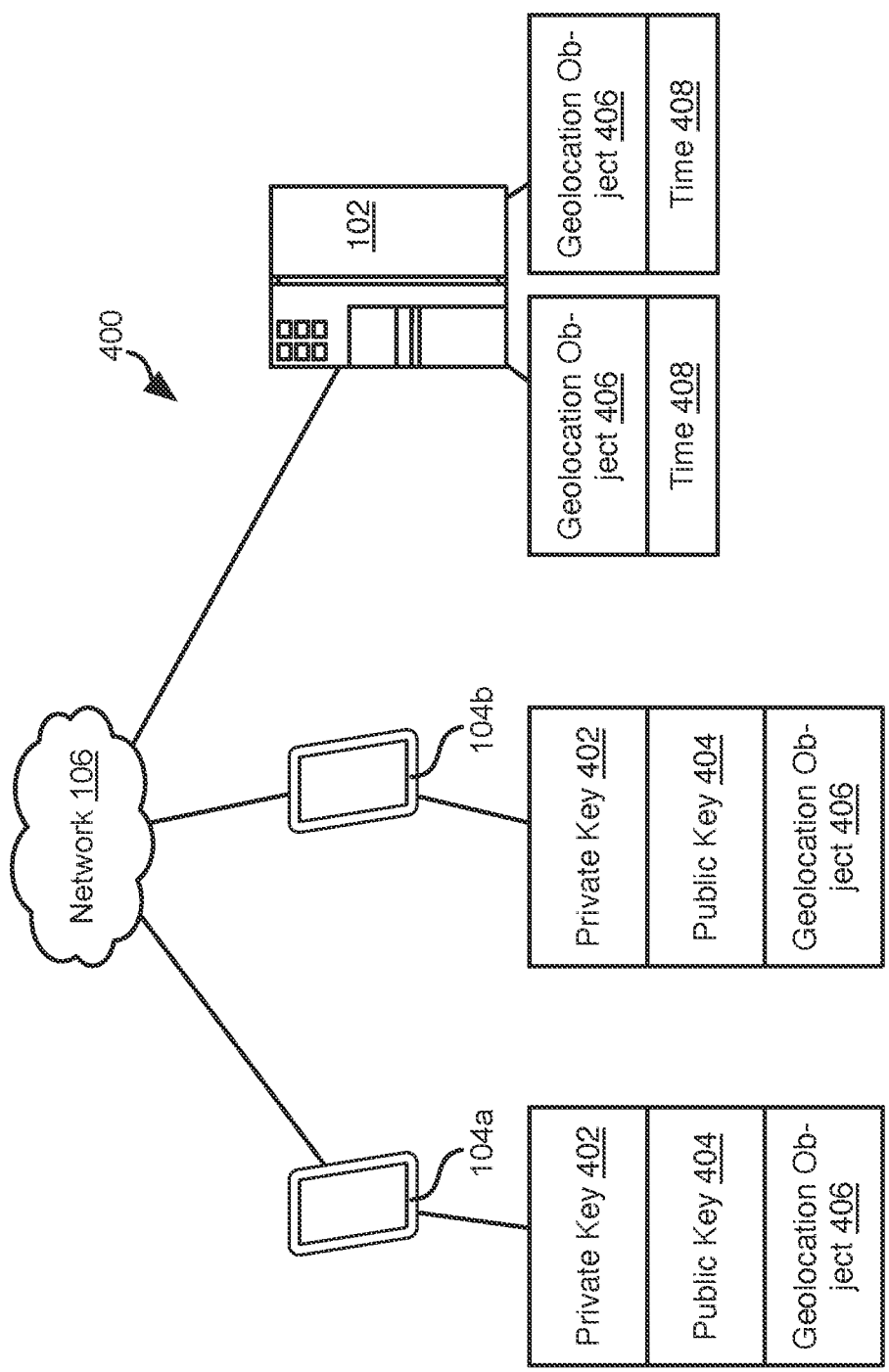
FIG. 4 is a schematic block diagram of a network environment for comparing device locations while preserving privacy in accordance with an embodiment of the present invention.

Referring to FIG. 4, the illustrated network environment 400 may be used to detect "impossible travel," i.e. detecting locations for the same device or different devices logged in to the same user account where the locations have times of receipt and a distance between them that indicate movement faster than permitted by the laws of physics or by the speed of typical transportation (sub-sonic aircraft, trains, cars, etc.). The occurrence of impossible travel therefore indicates the possibility of an attacker accessing a device or account of the user.

It is important for an enterprise to determine when impossible travel has occurred in order to reduce risk. However, in order to calculate whether "impossible travel" has occurred, traditionally the actual location and time at which location was measured must be sent by a device or otherwise obtained by the enterprise and processed at an enterprise server. If an enterprise server has these time stamped locations of the device, then the Enterprise could track the user's location, compromising the user's privacy.

FIGS. 4 through 6B illustrate an approach to determining the occurrence of impossible travel without compromising the privacy of a user. Referring specifically to FIG. 4, a user may have multiple devices 104a, 104b registered with the server system 102, i.e. an identifier of the device 104a, 104b associated with the account of the user as stored or accessed by the server system 102.

Each device 104a, 104b may have a private key 402 generated by itself and having corresponding public keys 404 provided to other devices 104a, 104b. The private key 402 of each device 104a, 104b may be secured securely on the device, such as in a secure element, TPM (trusted platform module), or TEE (trusted execution environment).

Each device 104a, 104b may also store public keys 404 received from others of the devices 104a, 104b. For example, public key 404 stored by device 104a may have been generated by and received from device 104b. For example, each device 104a, 104b may forward its public key 404 to the server system 102 as part of a registration process. The server system 102 will then forward all the public keys 404 of previously-registered devices 104a, 104b of a user to any new devices that register and send the public key of the new device to all previously-registered devices. The public key is sent to other devices already registered for the user.

Each device may further generate geolocation objects 406 recording the location of the device 104a, 104b at a point in time. The objects 406 may be encrypted according to the approach described below. The geolocation objects 406 of the registered devices 104a, 104b may be transmitted to and stored by the server system 102. The objects 406 may further be tagged with a time 408 that is either a time of recording of the location stored in the object 406 as recorded by the device 104a, 104b, a time of receipt of the object 406 by the server, or some other time that approximates when the device 104a, 104b that generated the object 406 was at the location recorded in the object 406. The time 408 may be clear text, i.e. non-encrypted, or encrypted.

Figure 5:
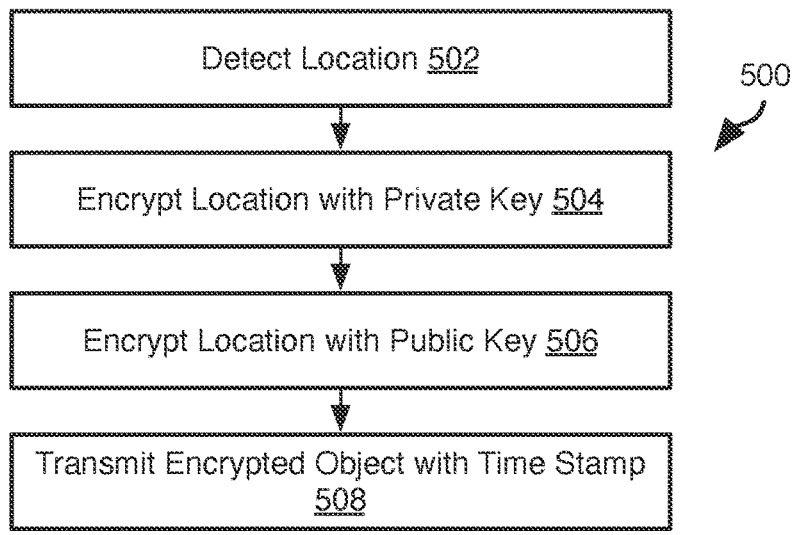
FIG. 5 is a process flow diagram of a method for obtaining encrypted locations of registered devices in accordance with an embodiment of the present invention.

FIG. 5 illustrates a method 500 that may be executed by a device 104a, 104b to generate a geolocation object 406. For purpose of the description below, device 104a performs the method 500, with the understanding that any other device 104b would perform the method in the same manner.

The method 500 may include detecting 502 the location of the device 104a, such as according to any of the approaches described above with respect to step 202 of the method 200. Data defining the location, such as GPS coordinates or other data describing the location is then encrypted 504 with the private key 402 of the device 104a to obtain an intermediate result. Step 504 may include encrypting the data defining the location, a timestamp of when the location was detected, and possibly a randomly generated nonce to increase entropy of the intermediate result. Other data fields may also be encrypted with the other data mentioned in order to generate the intermediate result.

The result of step 504 may then further encrypted 506 with the public key 404 of the device 104b to obtain an encrypted geolocation object 406. Note that there may be more than two device registered to a user such that step 504 is performed multiple times resulting in multiple encrypted geolocation objects 406, one for each additional registered device encrypted using the public key 404 of that additional registered device.

Each encrypted object 406 is then transmitted 508 to either (a) one or more other registered device 104b directly or (b) transmitted to the server system 102, which may then distribute the object 406 to one or more other registered devices of the user. Transmitting 508 in either case may be done over a secure channel, such as a virtual private network (VPN) or other encrypted connection. The object 406 may be transmitted with an identifier identifying the registered device 104a as the transmitting the object 406 and therefore enabling selection of the correct public key by the device 104b. The object 406 may be transmitted with an identifier of the device 104b whose public key was used to perform the second encryption, thereby enabling the server system 102 to send the object 406 to the correct device 104b when performing an impossible travel determination. The identifier of a device 104a, 104b may be embodied as a hash of its public key 404 provided during registration.

The object may be transmitted 508 with a timestamp approximating when the device was at the location, such as the time the object 406 was generated according to steps 504, 506, a time the location was detecting using a GPS receiver or other location determination mechanisms, a time the object 406 was sent to the server, or other time that will approximate when the device 104a was at the location recorded in the object 406. Alternatively, the server system 102 may tag the object 406 with a time of receipt. The time stamp may be clear text or encrypted.

The server system 102 may facilitate asynchronous sharing of geolocation objects 406 between registered devices 104a, 104b. For example, the server system 102 may store geolocation objects 406 and then forward them to a device 104a, 104b upon receiving a request from the device 104a, 104b or upon the server system 102 detecting a need to evaluate whether impossible travel has occurred. The server system 102 may purge an object 406, such as after an expiration period following receipt or upon receiving a newer object 406 corresponding to the same device identifiers as the object 406. In some embodiments, the collection of devices 104 which can securely share encrypted geolocation data in support of determining whether there has been impossible travel may include the devices of more than one user.; In such embodiments, the individual users of the devices 104 in the collection cannot see the geolocation data, rather the devices in the collection are used to provide a secure place to do the impossible travel calculations without disclosing actual geolocation data to an enterprise.

Figure 6A:
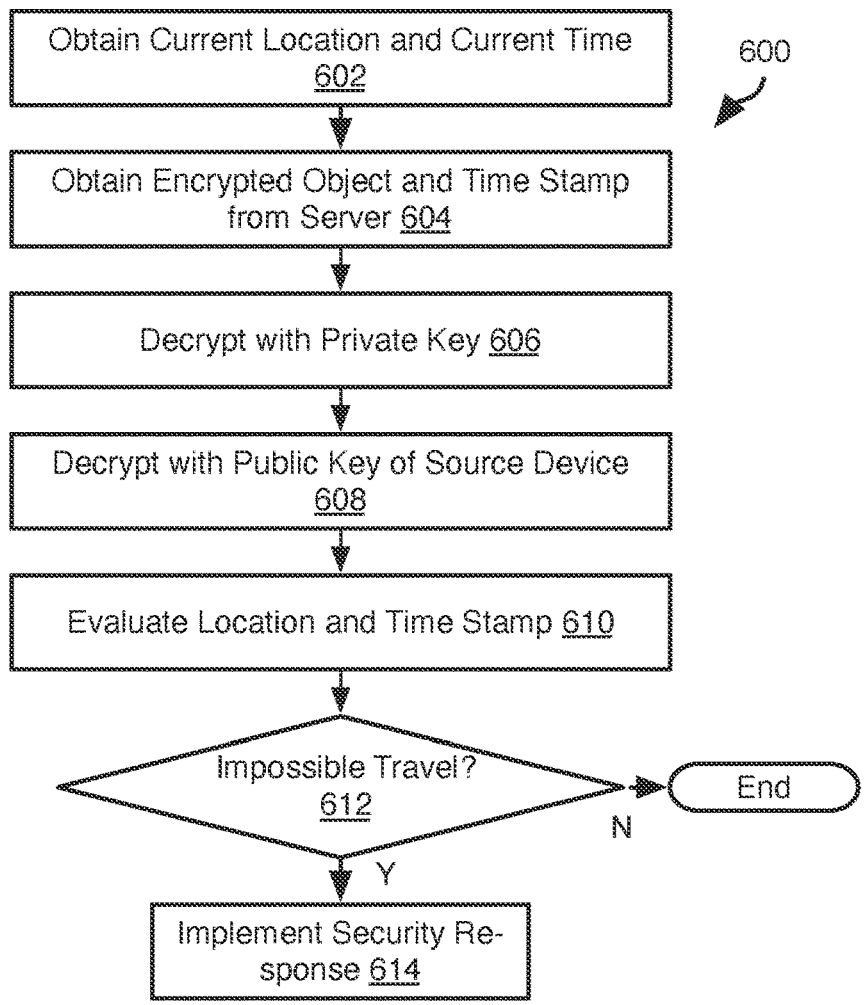
FIGS. 6A and 6B are process flow diagrams of methods for identifying impossible travel of a user in accordance with an embodiment of the present invention.

FIG. 6A illustrates a method that may be executed by a device 104a, 104b, such as a security component executing on the device 104a, 104b, in coordination with the server system 102 in order to detect impossible travel of one device 104a relative to the other device 104b without revealing the location of the devices 104a, 104b. For purposes of the description below, device 104a is discussed evaluating its location with respect to the device 104b. However, these roles may readily be reversed.

The method 600 may be invoked by the server system 102. For example, upon detecting an attempt to login by the device 104b, the server system 102 may obtain a geolocation object 406 from device 104b (per method 500) and transmit it to device 104a to evaluate whether the login attempt is legitimate or an intrusion attempt. The method 600 may be invoked by the device 104a. For example, upon detecting its location as part of another process or according to a periodic schedule, on startup, or based on some other triggering event, the device 104a may request the geolocation objects 406 of other registered devices 104b in order to determine whether impossible travel has occurred. Other triggering events may include security events (e.g., potential intrusions, attacks, or anomalous events), authentication events (e.g., logging in to the device or an application executing on the device), or network change (e.g., the device connecting to a different network).

The method 600 may include the device 104a obtaining the current time and detecting its current location according to any of the approaches described herein. The device 104a obtains 604 the encrypted geolocation object 406 of device 104b from the server 104a along with its time stamp 408. The device 104a decrypts 606 the object 406 using the private key 402 of the device 104a to obtain an intermediate result. In particular, as described with respect to the method 500, the second encryption step is performed using the public key of another device, which would include the device 104b encrypting the object 406 using the public key of the device 104a. Accordingly, the second layer of encryption may be decrypted using the private key of the device 104a.

The intermediate result of step 608 is then further decrypted 608 using the public key of the device 104b that is stored on the device 104a to obtain the unencrypted location data from the object 406. Since there may be multiple registered devices, the device 104a may store multiple public keys. The device 104a may select the public key to use according to the label of the object 406. For example, where the label is the hash of the public key of the device whose private key was used to encrypt the object 406, the device 104a may compare hashes of the public keys it stores to identify which one matches and then use the public key with the matching hash at step 608.

The method 600 may then include evaluating 610 the location and time from step 602 with respect to the location from step 608 and the time stamp received at step 604. In particular, a distance (D) that is the difference between the location of step 608 and the location from step 602 and a time difference (dT) that is a difference between the time stamp and the time from step 602. A required speed for the user to traverse the distance may be calculated as V=D/dT. This velocity may be compared to a threshold. The threshold may be a fixed value, e.g. the speed of a typical commercial airliner (e.g., 907 km/h for a BOEING 737) or a function of one or both of distance and time. For example, for small distances, flight is unlikely so a lower speed is reasonable, e.g. 120 to 180 km/h. Accordingly, the threshold function may increase with increase in the distance. The value of the threshold may be selected based on desired degree of risk, a low threshold will present less risk but possibly flag actual movement of the user as impossible. A high threshold will possibly allow some cases of impossible travel but avoid flagging actual movement of the user as impossible travel.

If impossible travel is found 612 to have occurred due to the velocity exceeding the threshold, the method 600 may include implementing 614 a security response. This may include some or all of:

Transmitting or displaying a notification to the user of the device on some or all of the registered devices 104a, 104b of the user.
Transmitting a notification to an administrator of the server system 102.
Denying access to enterprise services or data to the devices 104a, 104b of the user until an additional authentication has been performed.
Requiring a more restrictive authentication from the user when accessing services or data of the enterprise.
Ending existing sessions with the devices 104a, 104b registered to the user or from accounts of the user.
Other security procedures to reduce risk.

As is apparent from the above description, the server system 102 may operate as an intermediary for the geolocation objects 406 and may even invoke an impossible travel evaluation but does not have the ability to determine the locations of the devices 104a, 104b. This is the case even if the server system 102 happens to have the public keys of any of the devices 104a, 104b due to the two-stage encryption of the geolocation objects 406. Timestamps may be used as described above to enable the server to select the correct object 406, i.e. a device 104a, 104b may provide a time at which it has detected its location and the server may select objects 406 for other registered devices that are closest to that time relative to other objects 406. In at least one embodiment, the travel data associated with the device 104 can be used to determine whether the travel was impossible, i.e. does not correspond to movement of the device measured by another means. For example, the steps or speed associated with a workout application or a navigation application on the mobile device can be used in the impossible travel determination.

In some embodiments, to avoid privacy attacks due to signal traffic analysis, the security component on the device 104a may perform the geolocation observation process (step 602) at a different time than a security events, authentication events, or network change that triggered execution of the method 600 or other triggers. In particular, the historical record for the user may show that the user commutes from home to work at certain times of the day, and thus a stage two geolocation object received at the server at a usual time of the user's arrival at the work location could be used to infer that the user is at that particular work location. To defeat this type of traffic analysis, the security component may be programmed to always send a geolocation object 406 to the server system 102 at one or more predefined times every day, regardless of whether the user's geolocation has changed or an observation has been triggered. Optionally, the security component may choose random times to send a geolocation object 406 to the server system 102.

Figure 6B:
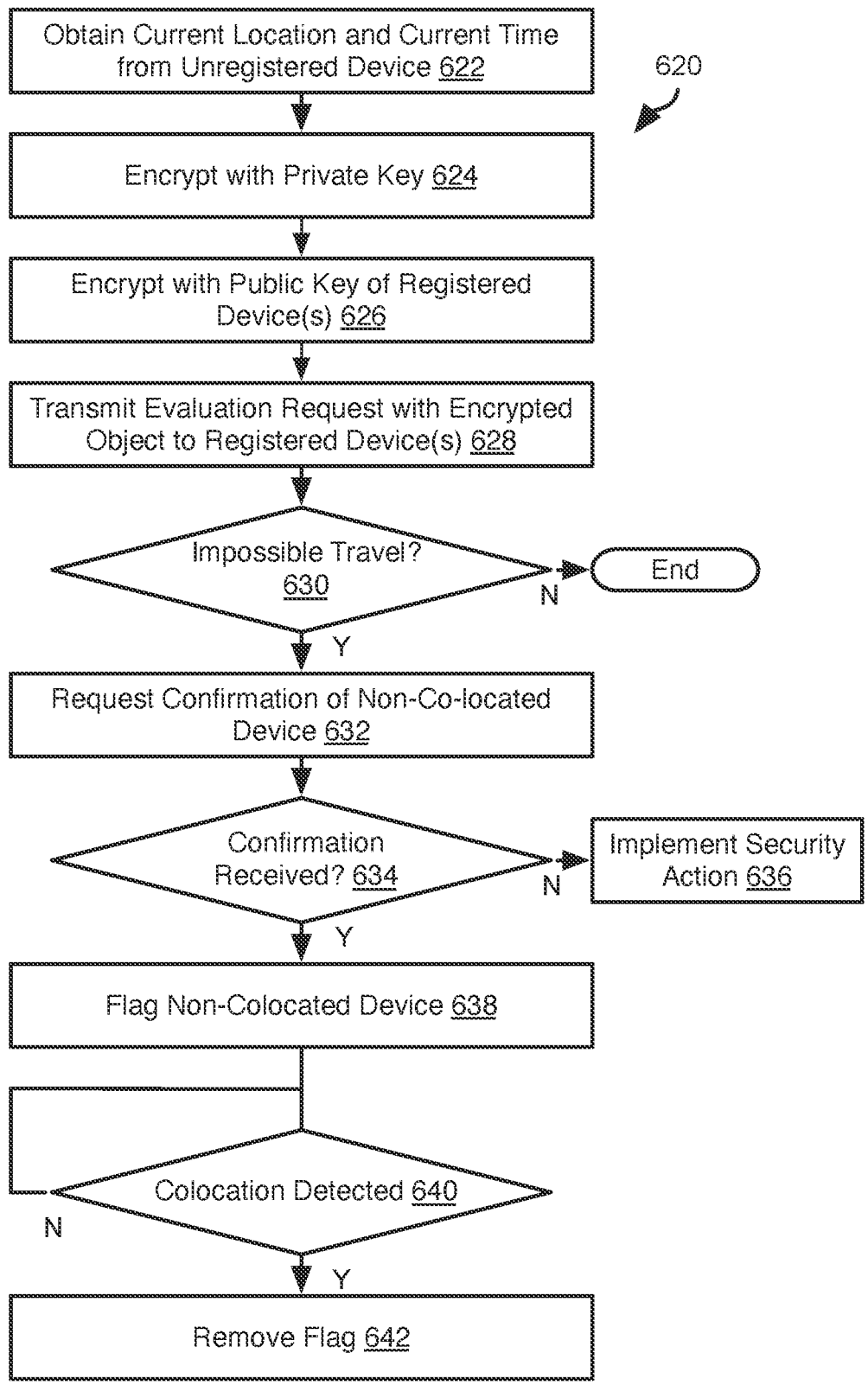

FIG. 6B illustrates a method 620 that may be executed by the server system 102 when a user logs in to a service implemented by the server system 102 from an unregistered device. The unregistered device may lack a security component programmed to perform the impossible travel evaluation or to generate a geolocation object 406.

Accordingly, the method 620 may include obtaining 622, from the unregistered device, a location of the unregistered device and a time stamp corresponding to when the location was determined. The location may be obtained by the unregistered device using any of the approaches described above with respect to step 202 of the method 200. Since the device is unregistered, the location and time stamp may be transmitted without encryption or an encrypted connection may be established over which the location and time stamp are transmitted to the server system 102.

The server system 102 may then encrypt 624 the location and time stamp with the private key of the server system 102 to obtain an intermediate result. The method 620 may be preceded by the server system 102 providing the public key corresponding to the private key to the registered devices 104a, 104b of the user, such as a part of the registering of the registered devices 104a, 104b. The unencrypted location and time stamp of the unregistered device may be deleted by the server system 102 immediately following encryption at step 624 such that the server does not retain a persistent copy of it.

For each registered device 104a, 104b, the result of step 624 is further encrypted 626 with the public key 404 of that registered device to obtain a geolocation object. The result of step 624 is therefore a geolocation object for each registered device. As for the method 600, the geolocation object may be labeled with an identifier of the registered device 104a, 104b whose public key 404 was used to encrypt the geolocation object.

In some embodiments, the geolocation object may also include an attestation signature from the unregistered device's secure element or TPM or TEE. This attestation can be verified at the server system 102 or at any registered device 104a, 104b to show that the geolocation object was created securely on a device.

Each geolocation object may then be transmitted 628 to the registered device 104a, 104b whose public key was used to encrypt it at step 626 with a request to perform an impossible travel evaluation. Performing this evaluation may be performed in the same manner as described above with respect to the method 600 of FIG. 6A. If any of the registered devices 104a, 104b find 630 that impossible travel has likely occurred, various actions may be taken. In some embodiments, this will be sufficient to implement a security action, such as described above with respect to the method 600 of FIG. 6A. In other embodiments, additional actions may be performed first to confirm that the unregistered device is not being operated by the user if impossible travel is found 630.

For example, the server system 102 may transmit a message to the unregistered device and possibly the registered devices 104a, 104b. The message may request 632 that the user confirm that the user and one or more of the registered devices 104a, 104b are not co-located. For example, the user may have left one of the registered devices 104a, 104b at home while traveling and is instead using the unregistered device at a hotel or partner facility.

In some embodiments, a user request or communication can erroneously be flagged as impossible travel and validation steps can be performed to verify whether the impossible travel designation is valid or erroneous. For example, a user can attempt to access a service, the attempt can be flagged as impossible travel because a previous user location is either incorrectly marked or is based on a fraudulent request (e.g., access by an intruder).

In such a situation, the user can be provided with validation steps such as a biometric authentication step (e.g., face recognition, fingerprint recognition), and/or the location of multiple user devices 104 (devices associated with the user) can be used to identify the user location. In some embodiments, the communication can be sent to the devices 104 associated with the user whose request is flagged as impossible travel to request confirmation of the validity, for example a message "Did you just attempt to login to application X?" In response to a user correctly answering validation steps/questions, the user request to access can be granted. In at least one embodiment, in response to the impossible travel determination being verified by the user as impossible travel, one or more accounts associated with the user can be locked (i.e., this can mean that an intruder previously accessed the user account and that is the cause of the erroneous impossible travel determination).

In the case of the unregistered device, a user may confirm that one or more of the registered devices 104a, 104b are not co-located with the user by means of an interface, e.g. webpage, presented on the unregistered device. The user may be required to authenticate through the interface to confirm the user's identity. If the user if found 634 to confirm non-co-location, the method 600 may include flagging 638 the registered device 104a, 104b found to be non-co-located (i.e., meet the impossible travel threshold) as being non-co-located in order to avoid detecting impossible travel again. However, upon detecting 640 that the user and the flagged device 104a, 104b are co-located again, i.e. the user logging into the flagged device 104a, 104b or another registered device 104a, 104b of the user being found to be co-located with the flagged device 104a, 104b, the flag may be removed 642. While the device is flagged as being non-co-located, it may be denied access to enterprise data and services.

If confirmation is not found 634 to have been received, such as within some threshold period of the request from step 632, the method 620 may include implementing 636 a security action, such as described above with respect to the method 600 of FIG. 6A. In particular, access of enterprise services and data by the unregistered device may be prohibited, limited, or subject to an additional authentication requirement.

Various alternatives to the methods 600 and 620 may also be used. For example, FIDO authentication may be performed by an extension executing on the unregistered device or a registered device 104a, 104b without sending any clear text geolocation information. The FIDO extension could implement the methods described above with respect to FIGS. 6A and 6B and therefore avoid having the server system 102 perform geolocation gathering or comparison that would compromise the user's location.

In some embodiments, the server system 102 creates a two-stage encrypted object as for the method 6B for both registered (i.e., executing a security component programmed to operate with the server system 102) and unregistered devices. These objects may be transmitted to all registered devices of the user in order to perform impossible travel determinations that may indicate an attack or deception.

The methods above may be implemented using a security component executing on the devices 104a, 104b as described above. As outlined above, the security component 122 itself may be an application installed and executing on the device 104a, 104b. The application may use a secure element (SE) of the device 104a, 104b, such as a TEE, TPM, secure storage, secure geolocation determination, or other trusted application executing on the device 104a, 104b. The security component 122 can include be a portion of the operating system, security app on the device, or a trusted app executing within a trusted execution environment, or a component of the operating system, or a component of the trusted operating system executing in a trusted execution environment, or a component of a browser, or a component executing on a device's baseband processor or FGPA. The secure element may also be code that executes on a separate processor in a device 104a, 014b, such as a digital signal processor (DSP), neural processor, neural co-processor, graphics processing unit (GPU), or baseband processor.

Likewise, the geolocation determination on a device 104a, 104b may be performed by any of the above described secure elements or separate processors referenced above. The geolocation may be attested by cryptographic signing with an attestation key implemented in hardware of the device 104a, 104b. The use of an attested geolocation can be important in a variety of situations, including ones in which an app installed on the "real world" operating system of the device (e.g., Android or iOS) is able to spoof the device GPS location. When this happens, a geolocation determined within the secure element of the device will be unaffected by the spoofing and is an authentic geolocation.

In some embodiments, some or all of the methods disclosed herein may be executed by firmware within the device 104a, 104b. In other embodiments, the methods disclosed herein may be implemented using a service or component of the operating system executing on the device 104a, 104b. In some embodiments, the geolocation objects 406 may be encrypted with a fully homomorphic encryption which allows for addition and subtraction operations that can be performed by the server system 102 in order to determine that there has been impossible travel. A fully homomorphic encryption is performed separately on each spatial component of the geolocation object. Homomorphically encrypting the latitude and longitude parts of the geolocation would not work, because it would not be possible to subtract the homomorphically encrypted parts of one geolocation from another and use them to compute a distance between them. But representing the geolocation by three coordinates (x, y, z) relative to the center of the earth would allow for differencing the homomorphically encrypted (x, y, z) coordinates of two geo locations and applying a Euclidean distance metric to determine a distance between the geolocations. In this embodiment, the participation of the second device 104b is not necessary in determining impossible travel by device 104a; rather the determination is made by the server system 102 using homomorphically encrypted geolocation coordinates.

Figure 7:
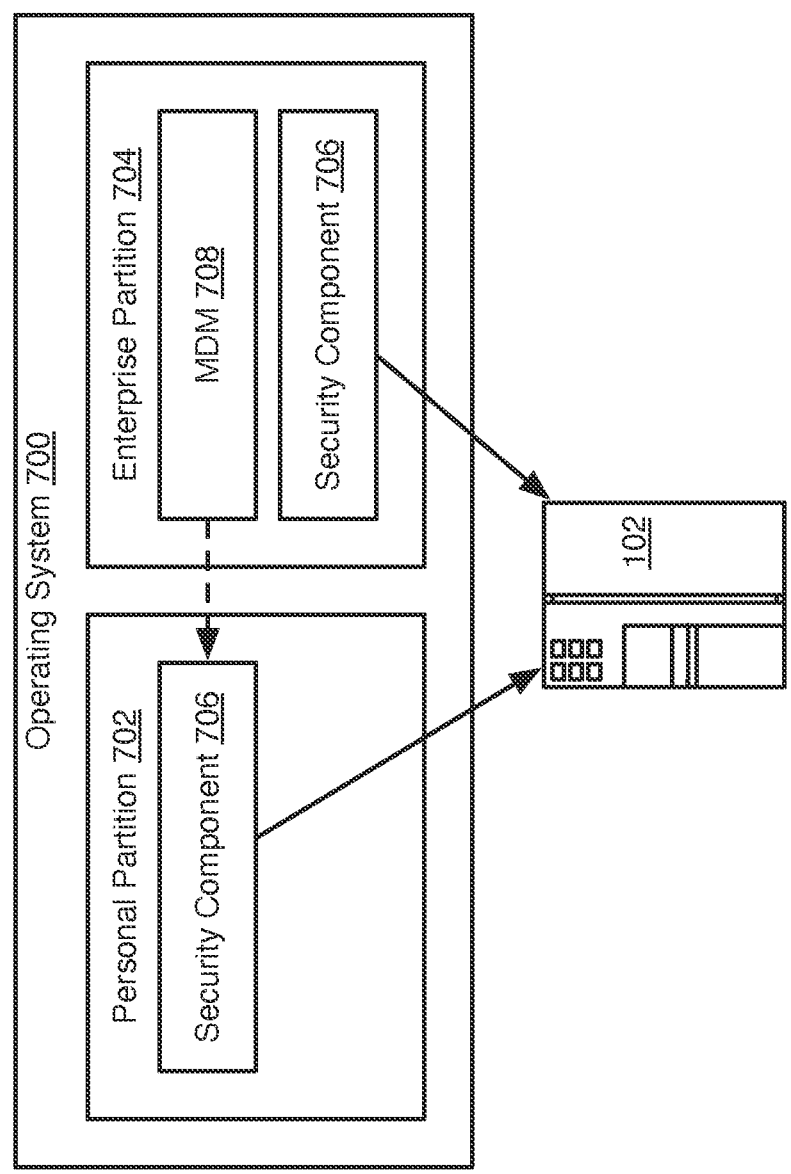
FIG. 7 is a schematic block diagram illustrating an approach for associating different partitions of the same device with one another in accordance with an embodiment of the present invention.

Referring to FIG. 7, in some contexts, the operating system 700 of a device 104 may be partitioned into a personal partition 702 and an enterprise partition 704. In particular, a device may be used for personal purposes and for enterprise purposes, i.e. a "bring your own device" work environment. The partitions 702, 704 may therefore function to protect the privacy of the user. In some embodiments, there may be more than one enterprise partition 704, e.g., if a user of the device is a contractor for or does some work for more than one enterprise. In an embodiment, there may be more than one personal partition 702, e.g., if the device allows different users to login to the device.

A disadvantage of this approach is that a security component 706 executing in one partition 702, 704 is not able to evaluate potential threats occurring in the other partition. Each partition 702, 704 may execute its own security component 706, but evaluations performed are not able to provide a complete picture of the state of the device 104.

Accordingly, various approaches may be used to identify security components 706 that are executing within different partitions 702, 704 on the same device in order to obtain a more complete view of the state of the device 104. In some instance, once security components 706 are determined to be executing on the same device, their functions may be divided up such that processing is not duplicated, i.e. if either security component can perform a task adequately to completely characterize one or more aspects of the state of the device 104, that task may be assigned to only one of the security components 706 in order to reduce processing load on the device 104. In either case, threat assessments by the security components 706 may be received by the server system 102 and used to characterize the state of the device. Likewise, the security components 706 may be instructed by the server system 102 to implement an appropriate security policy as determined according to the approach described above with respect to FIGS. 1 through 6.

In one type of approach, the security components 706 communicate with the server 102. The server 102 obtains information from the security components 706 and determines whether the security components are from different partitions 702, 704 of the same device. This may be performed in various different ways explained below.

In some embodiments, MDM (mobile device manager) 708 executing on the enterprise partition 704 may provide an application programming interface (API) able to register a cross-profile intent that is accessible from within a process executing in the personal partition. The security component 706 in the enterprise partition 704 may therefore instruct the MDM. This cross-profile intent may include an attribute, and/or data, such as a unique identifier. The security component 706 executing in the personal partition 702 may be programmed to retrieve this unique identifier from the cross-profile intent. Both security components 706 may then communicate this unique identifier to the server system 102, which then determines that the security components are executing on the same device 104 since they both presented the same unique identifier. In at least one embodiment, the process executing on the personal partition 702 can provide the cross-profile intent to the enterprise partition. In another embodiment multiple partitions can be associated with a device 104, and at least one partition can provide cross-profile intent to one or more of the other partitions associated with the device.

In some embodiments, each security component 706 transmits an attribute that uniquely identifies the device 104. The server system 102 determines that two or more security components have submitted the same unique device identification information are on the same device 104. The unique device identification information may include a phone number of the device 104; a device identifier such as a machine access code (MAC) address; a mobile device identifier such as a GOOGLE Advertising Identifier (GAID), IOS identity for advertisers (IDFA), or identifier for vendor (IDFV) from MICROSOFT, device root key, identifier generated using device root key, identifier associated with the device trust zone, certificate generated or signed in the device trust zone, or a universal device identifier (UDID) for IOS.

In some embodiments, the unique device identification information is a code received by way of the MDM 708, such as a work profile provided in configuration data of the MDM 708 sent as part of activation of the MDM 708. The device 104 then receives a code from the server system 102 in order to associate the security component 706 in the personal partition 702 with the work profile associated with the MDM 708 in the enterprise partition 704.

In some embodiments, attributes of the device 104 are obtained by each security component 706 and transmitted to the server 102, which then determines whether these attributes are identical and therefore correspond to the same device 104 with sufficient certainty. These attributes may include configuration settings, hashes of personal identity information (PII) (i.e., such that privacy is preserved and actual PII is not readable), battery state, other device attributes. These attributes can be used to determine whether the one or more partitions of the device are associated with the same device. For example, the first partition can identify that it is associated with a device that has 73% battery power, is located at 1 Front St. San Francisco, CA now, and was located at 50 Battery St. San Francisco, CA 60 minutes ago. The second partition can identify that it is associated with a device having 73% battery power, that is located at 1 Front St. San Francisco, CA, and was located at 50 Battery St. San Francisco, CA 60 minutes ago. These attributes identified by the partitions can be used to determine that the first partition and the second partition are on the same device. In at least one embodiment, the attributes associated with the one or more partitions can be hashed and the partitions that have matching hashes can be determined to reside on the same device.

In some embodiments, the security components 706 are programmed to listen to a common port and are enabled to communicate with one another over this port. This channel of communication may be used to exchange threat data between the security components 706 and/or to exchange a unique identifier (or other attributes) that may be sent to the server to enable correlation according to the first embodiment.

In some embodiments, one security component 706 sends out a BLUETOOTH broadcast that is detected by the other security component. This channel of communication may be used to exchange threat data between the security components 706 and/or to exchange a unique identifier that may be sent to the server to enable correlation according to the first embodiment.

Figure 8:
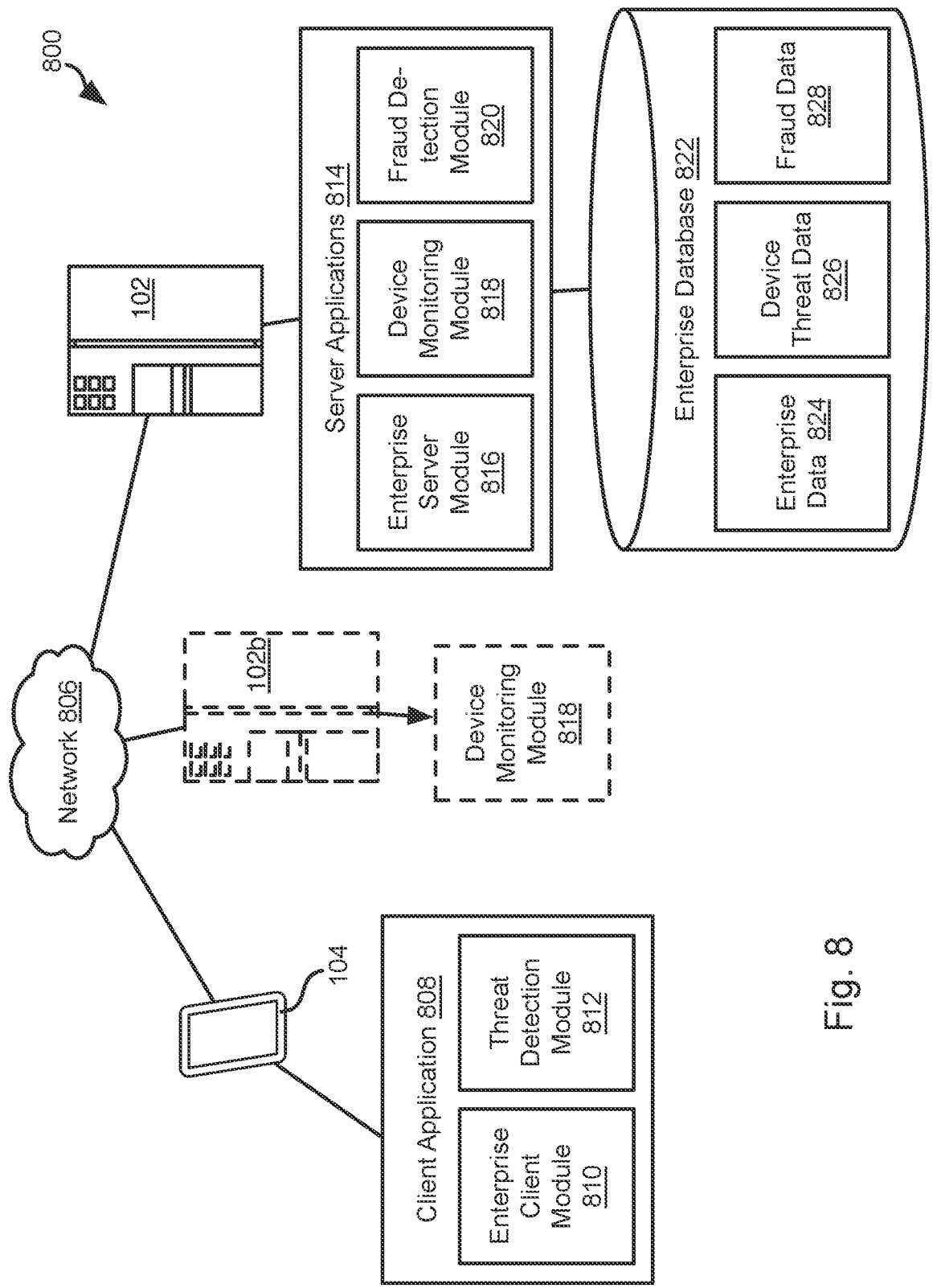
FIG. 8 is a schematic block diagram of a network environment for performing methods in accordance with an embodiment of the present invention.

Referring to FIG. 8, a network environment 800 may include a server system 102, which may perform some or all of the functions of the server system 102 described above. The server system 102 may include one or more computers operating as a system to perform the methods ascribed herein to the server system 102. The server system 102 may interact with user devices 104. The user devices 104 may be mobile devices such as a smartphone, tablet computer, wearable computer, laptop computer, or the like. The mobile devices 104 may execute a mobile operating system. The user devices 104 may also be desktop computers or other server computers executing an operating system. The devices 104 and the server system 102 may communicate by way of a network 106, such as a local area network (LAN), wide area network (WAN), the Internet, or the like. The network 806 may include both wired and wireless network connections, such as WI-FI or cellular data connections.

A device 104 may host a client application 808. The client application may include an enterprise client module 810 (hereinafter "client module 810") that performs a function in cooperation with the server 102 to perform some activity for the benefit of one or both of the user operating the device 104 and the entity providing the application 808 and functionality executing on the server 102 in cooperation with the application 808.

For example, the client module 810 could implement a banking or investing application through which a user may view the status of accounts and invoke actions such as transferring money between accounts, purchasing investment assets, depositing money, withdrawing money or performing other banking or investing activities. The application 808 could be an ecommerce application through which a user browses available products, views product descriptions and images, and purchases products. These are just two examples of applications. Any application that creates or uses personal information, financial information, or other sensitive information may benefit from the system and methods disclosed herein.

The application 808 may have embedded therein a threat detection module 812. The threat detection module 812 evaluates a state of the device 104 on which the application 808 is executing in order to determine potential threats. In some embodiments, the threat detection module 812 is a third-party software development kit (SDK). The threat detection module 812 may function as a security component and implement some or all of the functions of the security component as described hereinabove. Accordingly, the threat detection module 812 may be limited in its access to personal identification information (PII) or other sensitive data used by or created by the client module 810. The threat detection module 812 may operate as a mobile device management (MDM) module that monitors the device 104 for risky activities (e.g., connections to networks with attributes that indicate a security risk) and malware (computer viruses, keyloggers, phishing software, ransomware, etc.). The client application 808 may interact with server applications 814 executing on the server system 102. The applications 814 may be separate applications that execute independently on the server system 102 with exchange of information between them as described herein. Alternatively, the server applications 814 may be components of a single application executing on the server system 102.

The server applications 814 may include an enterprise server module 816 ("server module 816") that interacts with the client module 810 in order to perform an activity for the benefit of one or both of the user of the device 104 and the entity controlling operation of the server applications 814. For example, where the entity is a bank or investment company, the server module 816 may perform tasks such as authenticating a user of the client module 810, transmitting interfaces including representations of the accounts of the user, receiving and executing instructions to display particular items of information, receiving and executing instructions to perform actions such as depositing, withdrawing, or transferring money or purchasing or selling of investment assets. The server module 816 may execute these instructions with a database and back end server that is programmed to execute the financial instructions and provide access to the database. Alternatively, the server system 102 may access the database and executes the financial instructions.

Where the client module 810 implements an ecommerce application, the server module 816 may receive search queries, execute them, and return listings of products to the device 104. The server module 816 may receive and execute instructions from the device 104 to display a product page, add items to an electronic shopping cart, process electronic payment, invoke shipping of a product, or any other function to be performed as part of executing electronic commerce.

The server applications 814 may include a device monitoring module 818. The device monitoring module 818 may interact with the threat detection module 812 to both receive reports of threats detected by the threat detection module 812 and to provide instructions to the threat detection module 812 regarding the detection of threats, e.g., information describing known threats, as well as actions to perform in response to detection of a threat, e.g. monitoring use, requiring additional authentication for use, permitting read only access, or blocking use altogether. The operation of the device monitoring module 818 in cooperation with the threat detection module 812 may be according to the functionality described in the incorporated applications.

In another embodiment, an application, a web app, or webpage in a browser can access some basic information regarding the geolocation of the device 104 without allowing access to the fine-grained geolocation of the device. For example, such an application, web app, webpage may need to know the country in which the device 104 resides in order to present a properly customized set of information regarding ecommerce product availability or pricing, or to properly enable or disallow the transmission of certain content (e.g., streaming media) based on the country in which the device resides. In current devices, in order for such an application, web app, or webpage to make such a content delivery decision according to geolocation, it must have access to the actual geolocation. In Android, for example, this could involve the ACCESS_FINE_LOCATION permission (good for location to the meters or hundreds of meters) or ACCESS_COARSE_LOCATION permission (good for location within a kilometer or two); in iOS a precision of location can be requested, e.g., kCLLocationAccuracyThreeKilometers or kCLLocationAccuracyKilometer or kCLLocationAccuracyHundredMeters or kCLLocationAccuracyNearestTenMeters or kCLLocationAccuracyBest, for example. Neither of these operating systems support a mechanism which preserves the privacy of the user while enabling a requesting app or web app or webpage to determine the country, state, or city corresponding to the geolocation without also disclosing a finer grained geolocation. In some embodiments, a traditional geolocation request receives a response with a level of granularity specified by a user or administrator of the device 104, e.g., to the level of city, state, or country (e.g., a coordinate at the center of the given area). In other embodiments, there is an API (provided by the security component 122 or built into a browser or an operating system) which provides the geolocation at this broad granularity, of city, state, or country, without disclosing the private actual fine-grained geolocation of the device. Such a geolocation can also be supplied from a secure element of the device 104, and optionally can be cryptographically attested so that the receiver of the geographic information can know that it has not been spoofed. Additionally this is advantageous to both the user of the device 104 and to the application, web app, or webpage in the situation in which the device 104 is using a VPN; in such a situation a traditional method of using IP geolocation would determine a geographic location associated with the endpoint of the VPN, not a geographic location corresponding to the actual physical location of the device, resulting in possibly incorrect geographically customized content being viewed or invalid permission to view requested content.

As shown in FIG. 8, in an alternative embodiment, the device monitoring module 818 is hosted on a third-party server system 102b, such as the third party providing the SDK of the threat detection module 812. Accordingly, the server system 102b may provide information to the server system 102, or vice versa, in order to perform the methods disclosed herein. In the description below, the module 818 is described as being hosted by the server system 102 with the understanding that the same function can be achieved by communicating with a device monitoring module 818 that is hosted on a third-party server system 102*b*.

The server applications 814 may further include a fraud detection module 820. The fraud detection module 820 may detect fraud based on interactions with the client module 810. The fraud detection module 820 may perform this function independent of threats detected by threat detection module 812 and device monitoring module 818. In particular, the fraud monitoring module 820 may look at attributes of communications and transactions associated with a user account to determine whether they indicate potential fraud. The attributes may include the location of the device 104 when a first transaction was performed, network to which the device 104 was connected when the first transaction was performed, other transactions of the user and their attributes relative to those of the first transaction (e.g., are they in a different state or country). The manner by which the fraud detection module 820 detects fraud may include any approach for fraud detection by financial institutions or online retailers. The fraud monitoring module 820 may also be hosted by another third-party server that evaluates transaction data and flags potential fraud to the server 102. In at least one embodiment, the fraud monitoring module 820 can evaluate transaction data in combination with device attributes (e.g., current location, device health status) and flag potential fraud to the server 102. In some embodiments, the fraud monitoring module 820 can evaluate transaction data in combination with impossible travel determination and flag potential fraud to the server 102. In at least one embodiment, the attributes associated with the one or more partitions can be used by the fraud monitoring module to determine a potential fraud.

In at least one embodiment, a first security component can be associated with a first partition, and a second security component can be associated with the second partition. At least one security component can be an SDK security component. It can be determined using attributes associated with the partitions and/or device that the second partition and the first partition are associated with the same device. Once one or more partitions are determined as being associated with the same device, the impossible travel determination can be based on information collected from one or multiple partitions. Furthermore, the fraud determination or threat detection can be based on information collected from one or multiple partitions associated with the device.

The server system 102 may host or access an enterprise database 822 that may include databases such as enterprise data 824, device threat data 826, and fraud data 828. Each of these may be separate databases and may be hosted in separate computer systems. One or both of the device threat data 826 and fraud data 828 may be in databases hosted by the third party providing the device monitoring module 818 and fraud detection module 820, respectively.

The enterprise data 824 may store data such as profiles of users, records of transactions (banking, investment, product purchase, etc.) conducted by the user, user preference data, records of user browsing and shopping activity, or any other data relating to the service provided by the entity controlling the enterprise server module 816.

The device monitoring module 818 may store the results of threat assessments by the threat detection module 812 on individual devices 104. The fraud data 828 may store records of transactions found to be fraudulent by the fraud detection module 820.

Figure 9:
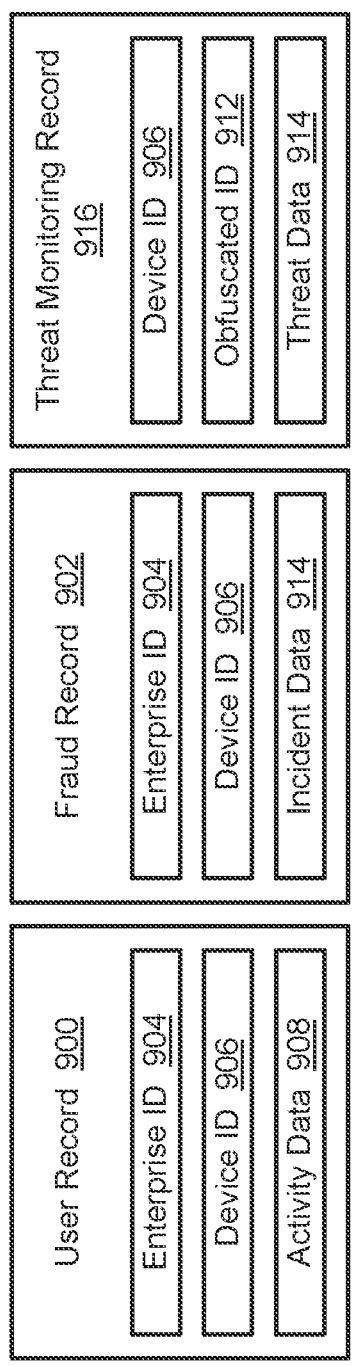
FIG. 9 is a schematic block diagram of a database for performing threat detection in accordance with an embodiment of the present invention.

Referring to FIG. 9, the enterprise data 824 may include user records 900 and fraud records 902 that include or are associated with an enterprise identifier 904 uniquely identifying a particular user. The user record 900 may further include one or more device identifiers 906 of devices used to access an account associated with the identifier 904. The device identifier 906 may have various forms. For example, for mobile devices it may be a GOOGLE Advertising Identifier (GAID), IOS identifier for advertisers (IDFA), or identifier for vendor (IDFV) from MICROSOFT. The device identifier 904 may be a universal device identifier (UDID) for IOS. The device identifier 904 may be a media access control (MAC) address of a network interface controller within a device 104. The device identifier 904 may be an identifier of a cookie stored on the device 104 by the server system 104.

The user record 900 may include activity data 908. The activity data 908 may recording details of activities performed with respect to the server module 816, e.g. financial transactions, browsing or shopping activity, or other activity relating to the service implemented by the server module 816 and the client module 810 for the benefit of the user or the entity controlling the server module 816.

The fraud data 828 may include fraud records 902 recording details of transactions determined to be fraudulent. A fraud record 902 may likewise include, or be associated with, one or both of an enterprise identifier 904 of the user involved in the transaction and a device identifier 906 of the device used to perform the transaction. The fraud record 902 may further include incident data 914, such as the location of the device 104, an identifier of the network or wireless access point to which the device 104 was connected, the details of the transaction (amount of money involved, type of transaction, product purchased, time of day, etc.).

The device threat data 826 may include a threat monitoring record 916 for threats detected or for each threat assessment reported by the threat detection module 812. A threat monitoring record 916 may include a device identifier 906 of the device on which the threat was detected or threat assessment was performed. The device identifier 906 may be any of the device identifier types listed above for the device identifier 906.

As noted above, one or both of the threat detection module 812 and the device monitoring module 818 may be implemented by a third party. Accordingly, access to the enterprise identifier 904 and other personal identity information (PII) by the modules 812, 818 may be limited. Accordingly, the record 916 may omit the enterprise identifier 904 or may not be associated with the enterprise identifier 904 in a database in which the record 916 is stored. In some embodiments, an association may be maintained that protects user privacy using an obfuscated identifier 912. The obfuscated identifier 912 may be derived from the enterprise identifier 904 of the user operating the device 104. For example, an encrypted version of the identifier 904, where the key used for encryption or needed for decryption is stored by the server system 102 but is not known to the modules 812, 818 or the third party entity providing them. In another approach, the identifier 904 is obfuscated by combining it with random data known to the enterprise module 818, such that the identifier 904 may be obtained from the obfuscated identifier 912 but cannot be derived by the modules 812, 818.

The identifier 904 may additionally or alternative include obfuscated (combined with random data, encrypted, or otherwise obfuscated) versions of PII, such as a name, credit card number, phone number, email address, or other value that may be used to uniquely identify a user.

The obfuscated identifier 904 may be passed to the threat detection module 812 on the user device 104 by the client application 808. The threat detection module 812 may thereafter include the obfuscated identifier 904 in threat assessments sent to the device monitoring module 808, which then creates the threat monitoring record 916.

Figure 10A:
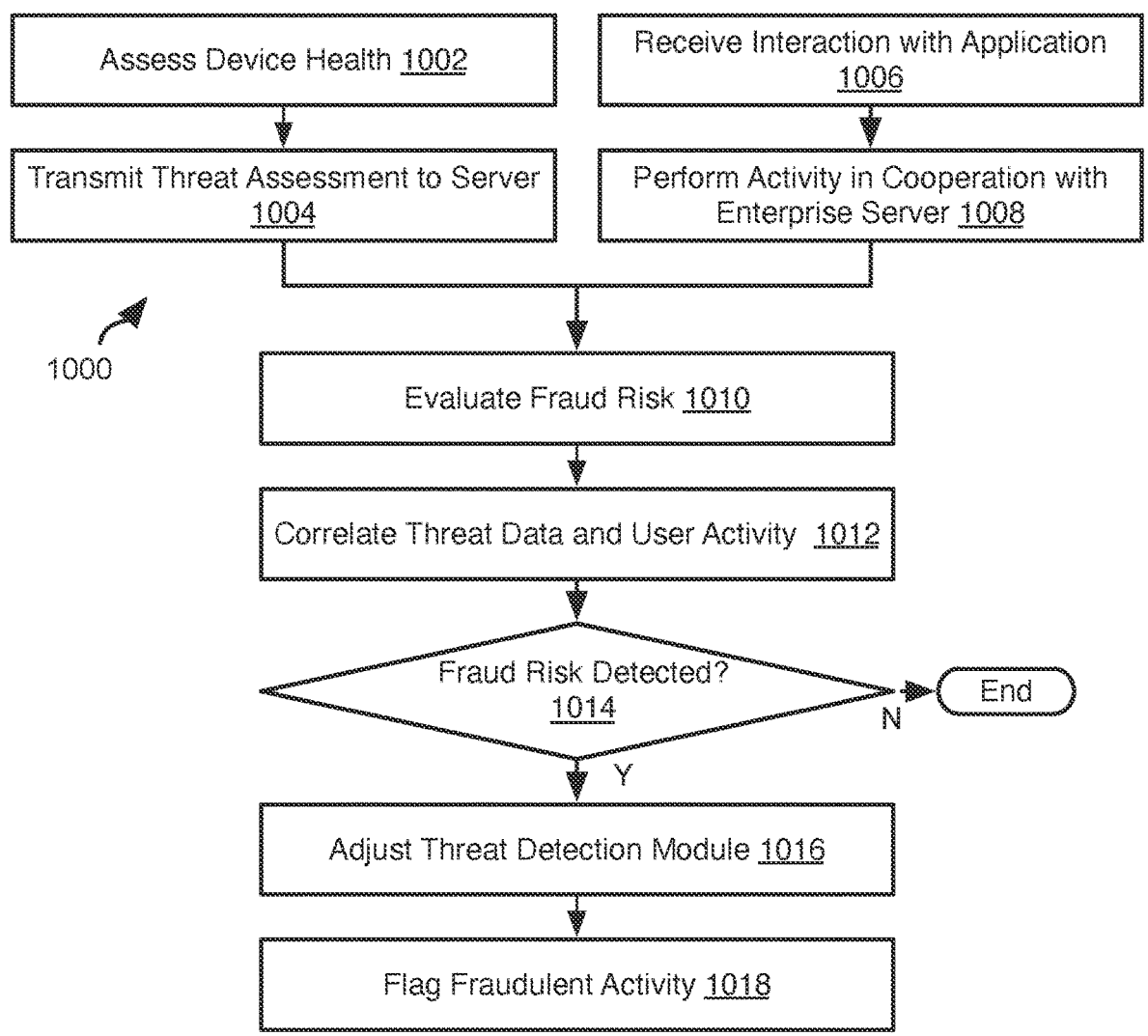
FIG. 10A is a process flow diagram of a method for performing threat detection in accordance with an embodiment of the present invention.

FIG. 10A illustrates a method 1000 that may be performed using the network environment 800 shown in FIG. 8. The method 1000 may include assessing 1002 health of a device 104 and transmitting 1004 a result of threat assessment to a server. As noted above, these steps may be performed by the threat detection module 812 and the threat assessment may be sent to the device monitoring module 818, which may be executing on the server 102 or a third-party server 102*b*. Assessing 1002 the health of the device 104 may be performed according to any of the functions of the threat detection module 812 disclosed above.

The method 1000 may further include receiving 1006 interaction by a user with the application 808 executing on the device 104 and performing an activity in response to the interaction in cooperation with the server 102, i.e. the server module 816. This activity may include any of the banking, investment, or ecommerce activities referenced above.

Steps 1002 and 1004 and steps 1006 and 1008 may be performed within some threshold temporal or geographic proximity to one another such that the threat assessment of steps 1002 and 1004 is relevant to the interaction and activity of steps 1006 and 1008. For example, Steps 1002 may be performed at a first location and at a first time and step 1006 and/or step 1008 may be performed at a second location and a second time. The second location may be within some threshold proximity of the first location and such that the device has not moved outside of that threshold proximity between the first time and the second time. Alternatively, a dynamic approach may be used: the threat assessment of steps 1002 and 1004 is deemed relevant to steps 1006 and 1008 in the event that the condition of the device has not changed between the first time and the second time: the device 104 has not connected to a different network, the device has not installed any new applications, no new malware has been detected, or no other material change to aspects of the device assessed have occurred. For example, a threat assessment may be triggered in response to any of these changes in network, applications, malware, or other aspect of operation of the device such that the last-performed threat assessment is deemed relevant to all steps 1006, 1008 performed thereafter until the next threat assessment is triggered by a change in condition or expiration of a predefined time period since the last threat assessment.

The subsequent steps of the method 1000 may be performed by the server system 102 either alone or in combination with one or more third-party servers. In particular, the server system 102 or a third-party server may perform the functions ascribed above to the fraud detection module 820 and evaluate 1010 whether the user interaction and activity of steps 1006 and 1008 indicate a potentially fraudulent transaction. Note in particular that step 1010 may be performed based exclusively on attributes of the transaction and without the benefit of information in a threat assessment from steps 1002 and 1004. In this manner, conventional fraud detection techniques used by retailers and financial institutions may be used.

The method 1000 may further include correlating 1012 threat data from the threat assessment of steps 1002 and 1004 with the user activity from steps 1006 and 1008. In particular, step 1012 may include determining a relationship between the threat assessment of steps 1002 and 1004 and the user identifier of the user account with which steps 1006 and 1008 are associated. In the case that the threat assessment is performed by a third party server 102*b* and provided to the server 102, the server 102 may determine which user identifier to associate with the threat assessment.

This may include obtaining the obfuscated identifier 912 included in the threat assessment or associated with the threat assessment and deriving the corresponding user identifier 904 from the obfuscated identifier, such as by decryption or removing random data used to generate the obfuscated identifier 912. Accordingly, the threat assessment from the device 104 of the user that also performed steps 1006 and 1008 may be identified. Alternatively, correlating a threat assessment with user activity may include determining a common device identifier 906 associated with a user record 900 of the activity and a threat monitoring record 916 recording the threat assessment.

Step 1012 may include evaluating correlated threat assessments and user activity for multiple users. For example, multiple transactions for multiple users may be found to be fraudulent. The correlated data from steps 1002 and 1004 and steps 1006 and 1008 for each of these users may be analyzed as a group. This may be performed to identify common circumstances among the data: i.e. a common wireless access point, a common network, a common malware, recent installation of a common suspect application, a common location (e.g., a common store or building, or all being within a threshold radius). Note that identifying common circumstances may be complex and use statistical or machine learning techniques to identify correlating factors that attended fraudulent transactions.

In another example, a bank may receive a request from an application for payment from an account associated with a user identifier 904. At step 1012, the server system 102 may determine from one or more threat assessments (e.g., impossible travel determination) from one or more of the user's devices 104 correlated with that user identifier 904 that that particular application is not actually installed on any of the user's devices 104. The request may therefore be flagged as fraudulent or potentially fraudulent.

Step 1012 may include creating a "kill chain" of events occurring on the user device 104, particularly with respect to the application 808 and conditions monitored by the threat detection module 812, up to and including the time of the fraudulent transaction. This kill chain may be combined with others to detect patterns that preceded a fraudulent transaction and these patterns may be loaded in to threat detection modules 812 in order to detect future attempts to perform fraudulent transactions.

Step 1012 may further include considering the correlated data from steps 1002 and 1004 and steps 1006 and 1008 in combination with other data known about the user due to interaction with the server module 816, such as spending habits, past locations at which the user has conducted transactions, demographic data (age, gender, income, etc.). For example, factors such as detecting fraud risk according to step 1010, threat data indicating potential threat (malware, unsecure network, etc.), and attributes of a transaction that are inconsistent with past user behavior may all be evaluated to determine whether as a combination these factors indicate that a transaction is fraudulent.

If fraud risk is found 1014 to be present according to step 1012, the method 1000 may include performing one or more actions to reduce risk in the future based on one or more factors found to indicate a fraudulent transaction at step 1012. For example, the server system 102 may inform the device monitoring module 818 of the fraudulent transaction and/or of each factor of the threat assessment (or threat assessments where multiple transactions of multiple users are evaluated) deemed to be correlated with risk of fraud.

In response, the device monitoring module 818 may adjust 1016 the function of the threat detection module 812 on one or more devices 104 for each factor. Such adjustments may include

- providing a signature (e.g. hash of an executable) of malware identified to be the factor such that the threat detection module 812 may detect subsequent instances of it
- instructing the threat detection module to require additional authentication when the factor is present
- instructing the threat detection module 812 to perform additional monitoring of a suspect application or executable
- performing more frequent threat assessments when the factor is present
- limiting use of the client module 810 when the factor is present
- limiting use of the client module 810 to only read-only type operations that will not alter user data when the factor is present
- limiting access by a user of the client module 810 to sensitive data when the factor is present and
- blocking access to the server module 816 when the factor is present.

The method 1000 may further include flagging 1018 the activity from steps 1006 and 1008 as fraudulent. This may invoke actions to reduce harm caused by the fraudulent activity, such as alerting the user of the device 104, stopping processing of payment, stopping fulfillment of a purchase, or performing other actions to reverse actions invoked in response to the fraudulent activity.

Figure 10B:
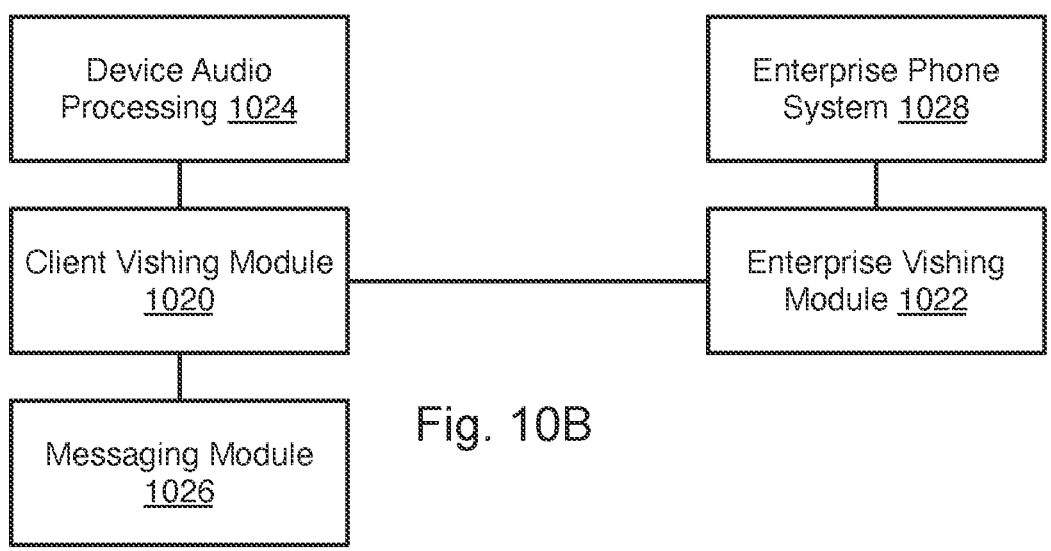
FIG. 10B illustrates components for detecting vishing in accordance with an embodiment of the present invention.

Referring to FIG. 10B, the illustrated components can be used to protect against voice phishing (vishing). In particular, the security component 122 on the device 104 may include a client vishing module 1020 that interfaces with an enterprise vishing module 1022 on the server system 102. The client vishing module 1020 may have access to device audio processing components 1024, e.g. a component that derives sound signals from received radio signals for playing on a speaker of the device 104, e.g., the audio of voice telephone calls. The client vishing module 1020 may further access a messaging module 1026, e.g., that component of the device 104 that receives and/or displays text messages (short message service (SMS), iMessage, etc.). The enterprise vishing module 1022 may have access to an enterprise phone system 1028, e.g. a system that some or all of tracks and initiates calls to clients of the enterprise by representatives of the enterprise. In particular, the enterprise vishing module 1022 may have access to records of calls to devices 104 of clients of the enterprise and possibly text messages and/or emails sent by the enterprise to the devices 104 of clients.

In the vishing-mitigation approach described below, actions described as being performed on the user device 104 may be performed by the client vishing module 1020 whereas actions described as being performed by the enterprise may be performed by the enterprise vishing module 1022. The security component 122 is described below as performing certain actions to mitigate vishing risk and these action may be invoked by the client vishing module 1020. Where no component is indicated as performing an action, it may be understood to be performable by either of the client vishing module 1020 or the enterprise vishing module 1022.

Vishing is a form of criminal phone fraud, using social engineering over the telephone system to gain access to private personal and financial information for the purpose of financial reward. Voice phishing can occur when deception is used to get a user to reveal personal, sensitive, or confidential information via a phone. For example, a consumer of a bank can receive a phone call from a bank phone number. The phone call can be initiated by a fraudulent caller using a spoofed bank phone number, the consumer can be fooled by the spoofed bank number and may reveal sensitive information to the caller and the caller can use that sensitive information to transfer large sums of money from the consumer's account or other action undesirable to the account owner. Vishing can include the scammer calling the enterprise using an enterprise customer's spoofed phone number.

Vishing scams can sometimes include a vishing caller (scammer) calling a consumer and the bank at the same time. The caller can pretend that he is a bank officer when speaking with the consumer, and pretend he is the consumer when speaking to the bank. The information the vishing caller learns from the consumer can be used to respond to questions from the bank representative, thereby granting the vishing caller full access or partial access to the consumer's account. In another case, a visher may induce the user to link a mobile payment application (e.g., SAMSUNG PAY or APPLE PAY) to an account with an enterprise to make fraudulent transactions without actually gaining access to or control of the account itself.

This enterprise vishing module 1022 can be used to protect the account owner, and/or the enterprise (e.g., bank). For example, the enterprise vishing module 1020 can be configured to screen calls at an enterprise call center to identify whether the caller to the enterprise call center may be associated with fraud based on telemetry such as the caller's speech patterns or a voice print matching a previous fraudulent incident. The enterprise vishing module 1022 can be configured to notify the account holder of a vishing attempt based on the caller telemetry. In some embodiments, an impossible travel determination can be performed based on the telemetry collected from a caller to a call center, and the location of the user device 104 associated with the account holder. The impossible travel determination can be used to determine a potential vishing threat based on impossible travel being identified.

In at least one embodiment, a client vishing module 1020 can be used to detect and protect against voice phishing risks. In some embodiments the client vishing module 1020 and enterprise vishing module 1022 can work in conjunction with the threat detection module 812, and fraud detection module 820, while in others the client vishing module 1020 can include or be included in the threat detection module 812 and/or the enterprise vishing module 1022 may be included in the fraud protection module 820. In at least one embodiment the enterprise vishing module 1022 can detect the telemetry of the user device 104 (such as as reported by the client vishing module 1020), and the enterprise telemetry associated with the enterprise call center to determine a vishing threat.

For example, if a user receives a call from bank A, and the bank A did not call the user, a fraud flag, a vishing risk level (e.g., score), and/or a notification can be associated with the user's account, or the user can be notified of the fraudulent call (e.g., via a push notification, or text message). In another example, when a high vishing risk is detected for a phone call received by the user device 104 based on the review of user device telemetry and the enterprise call center telemetry, the phone call can be automatically terminated by the security component 122 in response to an instruction from the enterprise vishing module 1022. In some embodiments, the user can be provided with an explanation for why the phone call was terminated (i.e., via text or email). In at least one embodiment, responsive to a call being received from an enterprise, data about the telemetry associated with the received call can be transmitted to the enterprise. The telemetry can be analyzed by the enterprise and a response as to whether there is a vishing threat based on the received telemetry can be determined and analysis results can be sent back to the user device 104. In another embodiment, in response to a call being received from an enterprise, the security component 122 can send a request to the enterprise requesting confirmation that the phone call was placed by the enterprise, based on the response received from the enterprise, remedial actions can be taken such as notifying the user of the potential vishing threat, or terminating the phone call.

The telemetry used to determine the threat determination (vishing risk level, fraud flag, etc.) can include mobile device's 104 call log, GPS location, current device state (e.g., whether the user is on the phone, whether the user received the call, whether the user made the call), device identifier, etc. The telemetry can also include information about the call center of the an enterprise, for example whether the phone call was received, the devices or phone numbers from which the account holder typically calls, the number of times the caller placed the customer service representative on hold, etc. The telemetry can also include information associated with caller (e.g., device from the caller is called, location, speech pattern, voice biometrics).

In some embodiments, in response to a vishing risk level being determined to meet a threshold (or other vishing threat determination, i.e., fraud flag), the user (caller and/or customer) can be provided with validation steps such as a biometric authentication step (e.g., face recognition, fingerprint recognition). In some embodiments, the communication can be sent to the one or more devices 104 associated with the user whose vishing risk level meets a threshold amount, for example a message "Did you just make a phone call to bank A and request to transfer funds?" In response to a user correctly answering validation steps/questions, the request can be rejected or accepted. In at least one embodiment, in response to the vishing attempt being identified, one or more accounts associated with the user can be locked (i.e., can mean that an intruder previously accessed the user account).

In some embodiments, in response to a vishing risk level being determined to meet a threshold (or other vishing threat determination, i.e., fraud flag), the user (owner of the account) can be provided with a transcript, partial transcript, and/or other communication describing the communication between the caller and the enterprise. In some embodiments, the communication can be sent to the one or more devices 104 associated with the user (owner of the account), for example a message "Received call at 5:15 pm from customer. Customer requested a fund transfer. If you did not make this request please contact the phone number in the back of your debit card." In some embodiments, the communication can be sent to the one or more devices associated with the user (owner of the account) via an app, for example a message can be displayed to the user "Received call at 5:15 pm from customer. Customer requested a fund transfer. If you did not make this request please click here." In some embodiments, the communication can be a phone call or other notification received by an application (e.g., security app, banking app) on the one or more devices 104 associated with the user (owner of the account).

In at least one embodiment where a full or partial transcript is created based on the conversation occurring on the customer device 104 and the enterprise side, the two transcripts can be compared to determine whether the two conversations are the same conversation. This comparison can be performed by using a text comparison algorithm, text similarity algorithm, or another algorithm can be used to determine whether the two conversations are the same conversation. If the two conversations are determined to be different conversations, the enterprise and/or the customer can be notified about the potential fraud associated with the customer and/or enterprise account.

In at least one embodiment, during a call with an enterprise (e.g, bank, financial institution, healthcare provider, government agency) a signal (e.g., inaudible sound) can be sent in the call to the device 104, the inaudible sound can be used to verify the device information of the person with whom the enterprise is speaking. The verification can include the signal causing a request for information from the device 104. The verification can also include a signal being configured to communicate with and/or invoke launching of a security application or enterprise application on the mobile device 104. For example, in response to a call from the phone call of an enterprise to the device 104, the security component 122 on the device 104 may be launched such that it can listen for the signal. For example, when call A is initiated between company B and caller C (scammer) about account F, and call D is initiated by caller C (scammer) to customer E (customer of company B) about account F, a signal can be triggered by company B on call A to determine whether the user device 104 is associated with customer E and in response to a determination that the device is not associated with customer E, an action can be taken. Actions can include notifying the company B of a potential fraud, notifying consumer E about the potential fraud, or locking account F.

In at least one embodiment, responsive to the inaudible signal being received by the user device 104, the security component 122 can be launched and transmit an acknowledgement via an encrypted/secure channel. In at least one embodiment, responsive to the a signal being received by the user device 104 from the enterprise call center, the security component 122 can transmit an acknowledgement to the enterprise. In some embodiments, a signal can be transmitted from the user device to the enterprise, and the enterprise can transmit the acknowledgement to the user device.

In some embodiments, once a vishing threat is identified, a customer associated with the enterprise account can be notified. For example, a push notification can be provided to the account holder based on the determination and can allow the user to take remedial steps or verification steps. For example, a customer can be provided with a push notification in-app (e.g., enterprise app) to verify identity. In another example, a video call can be initiated (e.g., in-app, VOIP (voice over internet protocol), or cellular) to verify user identity visually. In at least some embodiments the visual identity can be verified using biometric information stored in association with the customer account.

At times, vishing and phishing can be combined. For example, a scammer can call a customer using a spoofed bank (or other enterprise) phone number to tell the customer that a link will be sent to them via text (or other means like email). The link sent can send a user to a phishing site that looks like a bank website (or other enterprise), but isn't. The website can request information from the user such as a username and password. Phishing is the fraudulent attempt to obtain sensitive information such as usernames, passwords and credit card details by disguising oneself as a trustworthy entity in an electronic communication. Typically carried out by email spoofing or instant messaging, it often directs users to enter personal information at a fake website which matches the look and feel of the legitimate site.

In some embodiments, when it is determined that a customer is on a phone call or has recently received (20 seconds prior, 40 seconds prior, 60 seconds prior, etc.) a phone call associated with an enterprise (i.e., bank), the phishing risk associated with a received URL can be determined to be higher. Responsive to a link being associated with a higher phishing risk, the website associated with the link can be loaded but sensitive information submitted to the website can may be blocked from being transmitted until the website is verified as an authentic website not associated with phishing. Responsive to a link being associated with a higher phishing risk, the website associated with the link can be rendered but a warning can be displayed indicating a potential phishing threat. In some embodiments, response to a link being associated with a higher phishing risk, the website associated with the link can be blocked until it can be verified as an authentic website not associated with phishing.

In some embodiments, once a vishing risk is detected the security component 122 can take action including launching an application which allows the user options for remedial actions, automatically adjusting the actions permitted in association with the customer account (e.g., adjust spending limit, lock bank account, lock enterprise account), raising phishing risk associated with the user, notifying the user, notifying the enterprise, terminating a phone call, initiating a VOIP phone call via security application, or other actionsIf the client vishing module 1020 is able to read text messages, then it may associate a higher level of risk with URLs received from a bank's phone number or short code. For example, if a URL is unknown to the client vishing module 1020 (e.g., status is UNKOWN in a database of URLs), one may use the bank SMS sender context to treat the URL as riskier than if this were not the case. Flexible policies could be applied to determine how to handle the link: it could be blocked, it could be analyzed while the user waits after which the user is allowed to access the URL if the analysis determines that it is not a threat, or the user could be warned that the URL may be malicious.

In some embodiments, if the URL is known to be safe, e.g. on a white list, the fact that the URL was received in a higher-risk context, e.g. within the predefined time window after receiving a call from the enterprise, then the URL may be treated as higher risk according to any of the approaches described above. This can account for the possibility that the website associated with the URL has been changed by an attacker.

Figure 11:
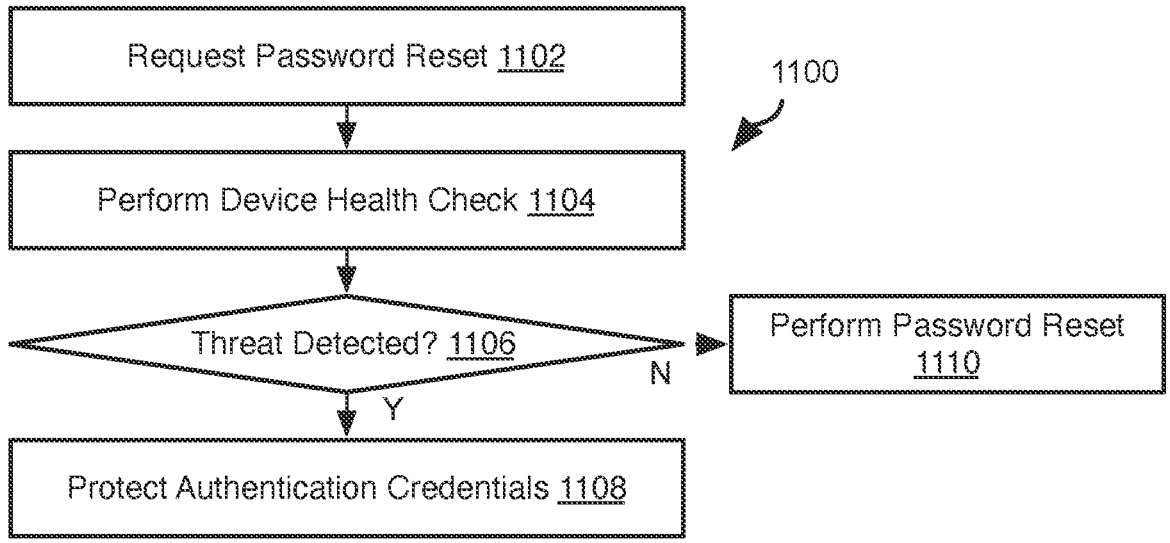
FIG. 11 is a process flow diagram of a method for detecting threats while resetting a password on a mobile device in accordance with an embodiment of the present invention.
Figure 12:
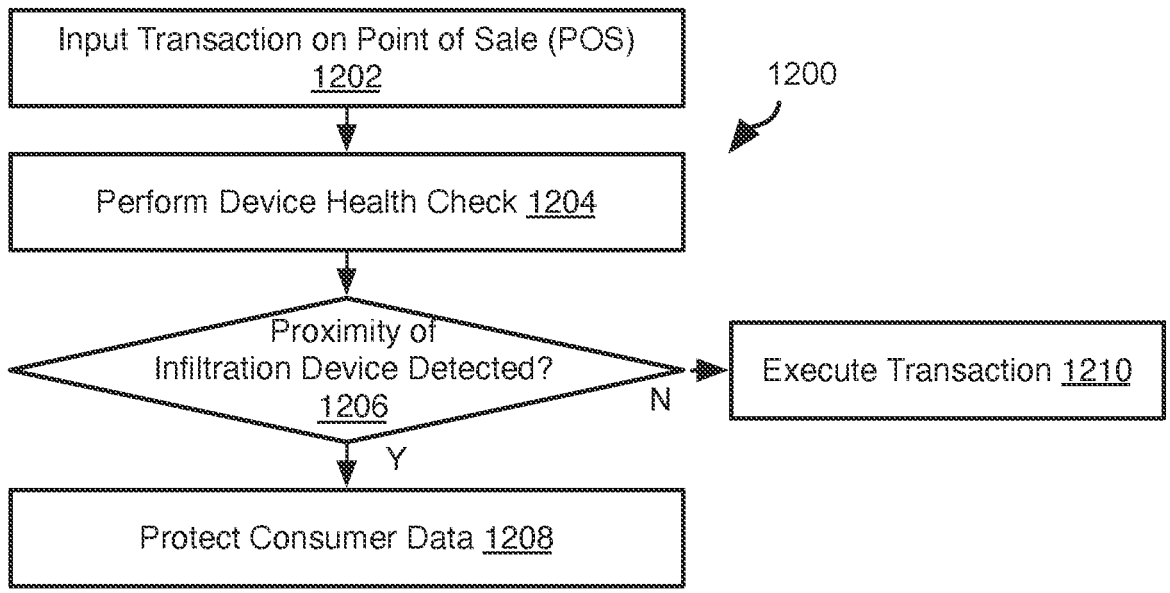
FIG. 12 is a process flow diagram of a method for performing threat detection at a point of sale in accordance with an embodiment of the present invention.

FIGS. 11 and 12 illustrate potential actions that may be performed by the threat detection module 812 in order to block malicious or fraudulent behavior detected according to the method 1000. In particular, the methods of FIGS. 11 and 12 illustrate how the threat detection module 812 may be integrated with the functionality of the client module 810 in order to promote security of customer interactions with an enterprise based on conditions present on the user's device 104.

Referring specifically to FIG. 11, the client module 810 may receive 1102 a request to reset a password. In response, the threat detection module 810 performs 1104 a health check. The threat detection module 812 may, for example, detect the presence of phishing malware or a keylogger designed to acquire the username and password of a victim. The threat detected may include malicious software displaying an image of a password reset screen according to the password reset of the application 808 in order to collect the user's username and password. The threat detected may be a threat that the detection module 812 was programmed to identify by the device monitoring module 818 according to the method 1000. Likewise, the actions performed in response to the threat according to the method 1100 may be those that the threat detection module 812 was programmed to perform by the device monitoring module 818.

If a threat is found 1106 to have been detected, the method 1100 may include performing 1108 one or more actions to protect authentication credentials of the user with respect to the application 808. These actions may include:
  substituting a different username and password from that which was input but a user
  dropping outbound packets from the malware
  coordinating with the server module 816 to require the user to reset the user's username and password before access will again be granted and
  performing any of the actions described above with respect to step 1016.

If no threat is detected, the method 1100 may include resetting 1110 the password of the user by means of the client module 810 and server module 816 according to any approach for resetting passwords.

Referring to FIG. 12, in another example, the device 104 is a point of sale (POS) device and the client module 810 is a point of sale application that processes transactions in cooperation with the server module 816 of a retailer or financial institution.

The method 1200 may include inputting 1202 a transaction on a POS device 104, i.e. a representative of the retailer scans an item or otherwise inputs an identifier of an item into the POS. Step 1202 may further include receiving payment information from a customer, e.g. a credit card number, gift card number, or other payment information.

Prior to transmitting the transaction data received at step 1202 to the server module 816, the POS device 104 may perform 1204 a threat assessment, such as using the threat detection module 812. The threat assessment may be performed according to any of the methods disclosed herein. In some instances, the threat assessment may detect 1206 proximity of an intrusive device attempting to infiltrate the POS device 104, such as by intercepting network traffic from the POS device 104. In response, the threat detection module 812 may take action to protect 1208 customer data, such as opening an encrypted tunnel to the server module 816, switching to a different network, performing additional encryption of the transaction data, alerting an operation of the POS device 104 to locate the intrusive device, or performing other actions to avoid providing the transaction data to the intrusive device.

Where no threat is detected 1206, the transaction may be executed 1210 in cooperation with the server module 816 without additional measures to protect from the invasive device, though some measures such as encryption may be performed regardless of detected risk.

The systems disclosed hereinabove may implement methods as recited below:

A. A method comprising:
receiving, by a server system, a geolocation object from a first device associated with a user;
transmitting, by the server system, the geolocation object to a second device associated with the user without determining a location of the second device; and
receiving, by the server system, a determination from the second device, the determination indicating whether a difference between a first location recorded in the geolocation object and a second location of the second device indicates a security risk.

B. The method of claim A, wherein the geolocation object includes a time stamp indicating a time that the first location was detected.

C. The method of claim A, wherein the geolocation object is encrypted using a private key of the first device.

D. The method of claim C, wherein the geolocation object is encrypted using a public key of the second device.

E. The method of claim A, further comprising storing by the server system the geolocation object for a period before transmitting the geolocation object to the second device.

F. The method of claim E, wherein transmitting the geolocation object to the second device comprises transmitting the geolocation object in response to a triggering event.

G. The method of claim F, wherein the triggering event occurs on the first device.

H. The method of claim A, wherein the determination from the second device indicates the security risk, the method further comprising:
in response to receiving the determination from the second device that indicates the security risk, implementing a security action with respect to the first device.

I. The method of claim H, wherein the security action includes at least one of (a) requiring authentication on the first device and (b) restricting access by the first device to at least one of data and services of the server system.

J. The method of claim A, further comprising:
encrypting, by the server system, the geolocation object using a public key of the second device to obtain an intermediate result;
encrypting, by the server system, the intermediate result with a private key of the server system to obtain an encrypted object; and
transmitting, by the server system, the encrypted object to the second device.

K. The method of claim J, wherein the determination from the second device indicates a security risk, the method further comprising:
confirming, by the server system, with a user associated with the second device, that the user is not co-located with the second device; and
in response to confirming with the user that the user is not co-located with the second device, setting by the server system, a flag on the server system indicating that the second device is co-located with the user.

L. The method of claim K, further comprising preventing, by the server system, the second device from accessing at least one of data and services of the server system while the flag is set for the second device.

M. The method of claim K, further comprising:
detecting, by the server system, that the user and the second device are co-located;
in response to detecting that the user and the second device are co-located, clearing, by the server system, the flag.

N. A system comprising one or more processing devices and one or more memory devices operably coupled to the one or more memory devices, the one or more memory devices storing executable code that, when executed by the one or more processing devices, causes the one or more processing devices to:
register with a server system by transmitting a local public key to the server system and receive a remote public key from the server system, the system storing a local private key corresponding to the local public key;
receive, from the server system, a request to evaluate a security risk with respect to an encrypted object;
in response to the request:
decrypt the encrypted object with the local private key to obtain an intermediate result;
decrypt the intermediate result with the remote public key to obtain a geolocation object;
detect a local time and a local location for the system;
evaluate the local time and the local location with respect to a remote time and a remote location stored in the geolocation object to obtain a security determination; and
notify the server system of the security determination.

O. The system of claim N, wherein the remote public key is a public key of another device that registered with the server system.

P. The system of claim O, wherein the encrypted object includes a label;
wherein the executable code, when executed by the one or more processing devices, further causes the one or more processing devices to:
obtain a label from the encrypted object;
select the remote public key from a plurality of public keys according to the label.

Q. The system of claim P, wherein the label is a hash of the remote public key.

R. The system of claim N, wherein the remote public key corresponds to a private key of the server system and stored on the server system.

S. The system of claim N, wherein the executable code, when executed by the one or more processing devices, further causes the one or more processing devices to:
determine a distance between the local location and the remote location;
determine a time difference between the local time and the remote time;
compute a velocity according to the distance and time difference;
compare the velocity to a threshold condition; and
when the threshold condition is met, determine that impossible travel has occurred.

T. The system of claim N, wherein the executable code, when executed by the one or more processing devices, further causes the one or more processing devices to:
execute a transaction with respect to an application executing on a first computing device;
receive a threat assessment from a security component embedded in the application;
correlate the transaction with the threat assessment; and
evaluate a security risk according to the threat assessment and attributes of the transaction.

Figure 13:
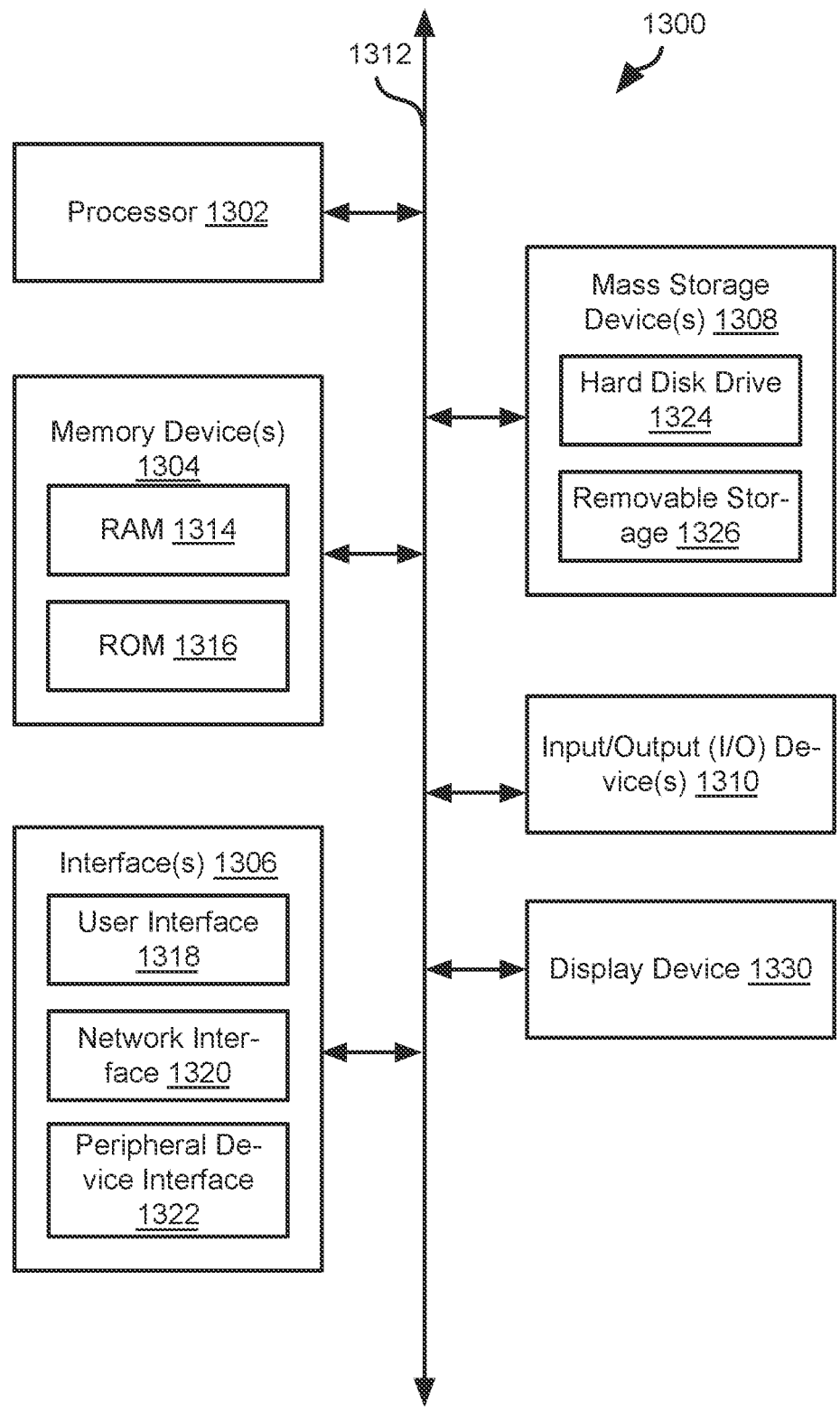
FIG. 13 is a schematic block diagram of a computer system suitable for implementing methods in accordance with embodiments of the present invention.

FIG. 13 is a block diagram illustrating an example computing device 1300 which can be used to implement the system and methods disclosed herein. The one or more computers of the server system 102 and the devices 104a, 104b may have some or all of the attributes of the computing device 1300. In some embodiments, a cluster of computing devices interconnected by a network may be used to implement any one or more components of the invention.

Computing device 1300 may be used to perform various procedures, such as those discussed herein. Computing device 1300 can function as a server, a client, or any other computing entity. Computing device can perform various monitoring functions as discussed herein, and can execute one or more application programs, such as the application programs described herein. Computing device 1300 can include devices such as a smartphone, a laptop computer, a desktop computer, a mobile subscriber communication device, a wearable computing device, a personal digital assistant (PDA), a tablet computer, an electronic book or book reader, a digital camera, a video camera, a video game console, a voice controlled assistant, a drone, a UAV, a vehicle, a personal robot, a robotic appliance, a smart TV, a set top box, a router, a cable modem, a tablet, a server, a thing in IoT, an ambient computing device (located in a mostly fixed location in a room or location, available to multiple users located in the vicinity of the device, smart rooms, etc.) and/or any other suitable computing device.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A non-transitory computer-readable medium storing executable code that, when executed by one or more processing devices of a mobile device, causes the one or more processing devices to:
   detect a device location of the mobile device; and
   obtain a security policy corresponding to the device location from a server system while obfuscating the device location from the server system;
   wherein the executable code, when executed by one or more processing devices of a mobile device, further causes the one or more processing devices to perform obfuscating the device location from server system by:
   generating a plurality of random locations;
   transmitting the plurality of random locations and the device location to the server system;
   receiving a plurality of security policies corresponding to the plurality of random locations and the device location; and
   selecting the security policy corresponding to the device location from the plurality of security policies.

2. The non-transitory computer-readable medium of claim 1, wherein the executable code, when executed by one or more processing devices of a mobile device, further causes the one or more processing devices to perform obfuscating the device location from the server system by:
   receiving a plurality of policy identifiers from the server system, each policy identifier of the plurality of policy identifiers mapped to a zone of a plurality of zones;
   identifying a policy identifier of the plurality of policy identifiers having the device location in the zone mapped thereto;
   transmitting the policy identifier corresponding to the device location to the server system; and
   receiving the security policy from the server system in response to transmitting the policy identifier corresponding to the device location to the server system.

3. The non-transitory computer-readable medium of claim 1, wherein the executable code, when executed by one or more processing devices of a mobile device, further causes the one or more processing devices to perform obfuscating the device location from the server system by:
  generating a plurality of random locations;
  transmitting the plurality of random locations and the device location to a category server that is separate from the server system;
  receiving a plurality of categories from the category server corresponding to the plurality of random locations and the device location;
  selecting a category corresponding to the device location from the plurality of categories, the category indicating a degree of risk without communicating the device location;
  transmitting the category corresponding to the device location to the server system; and
  receiving the security policy from the server system in response to transmitting the category corresponding to the device location to the server system.

4. The non-transitory computer-readable medium of claim 3, wherein the category server is an anonymous server that does not require authentication for access.

5. The non-transitory computer-readable medium of claim 1, wherein the executable code, when executed by one or more processing devices of a mobile device, further causes the one or more processing devices to perform obfuscating the device location from the server system by:
  receiving a public key of a remote device other than the server system;
  encrypting the device location with a private key of the mobile device and the public key of the remote device to obtain a geolocation object; and
  transmitting the geolocation object to the remote device by way of the server system.

6. The non-transitory computer-readable medium of claim 5, wherein the executable code, when executed by one or more processing devices of a mobile device, further causes the one or more processing devices to perform obfuscating the device location from the server system by:
  detecting the device location at a first time; and
  delaying transmitting the geolocation object until a second time in order to prevent inferring of the device location.

7. A method comprising:
  receiving, by a server system, a geolocation object from a first device associated with a user;
  transmitting, by the server system, the geolocation object to a second device associated with the user without determining a location of the second device; and
  receiving, by the server system, a determination from the second device, the determination indicating whether a difference between a first location recorded in the geolocation object and a second location of the second device indicates a security risk;
  wherein the geolocation object is encrypted using a private key of the first device and a public key of the second device;
  wherein the method further comprises:
    confirming, by the server system, with a user associated with the second device, that the user is not co-located with the second device; and
    in response to confirming with the user that the user is not co-located with the second device, preventing, by the server system, the second device from accessing at least one of data and services of the server system.

8. The method of claim 7, wherein the geolocation object includes a time stamp indicating a time that the first location was detected.

9. The method of claim 7, further comprising storing by the server system the geolocation object for a period before transmitting the geolocation object to the second device.

10. The method of claim 9, wherein transmitting the geolocation object to the second device comprises transmitting the geolocation object in response to occurrence of a triggering event on the first device.

11. A system comprising one or more processing devices and one or more memory devices operably coupled to the one or more memory devices, the one or more memory devices storing executable code that, when executed by the one or more processing devices, causes the one or more processing devices to:
  register with a server system by transmitting a local public key to the server system and receive a remote public key from the server system, the system storing a local private key corresponding to the local public key;
  receive, from the server system, a request to evaluate a security risk with respect to an encrypted object; and
  in response to the request:
    decrypt the encrypted object with the local private key to obtain an intermediate result;
    decrypt the intermediate result with the remote public key to obtain a geolocation object;
    detect a local time and a local location for the system;
    evaluate the local time and the local location with respect to a remote time and a remote location stored in the geolocation object to obtain a security determination; and
    notify the server system of the security determination;
  wherein the remote public key is a public key of another device that is registered with the server system;
  wherein the encrypted object includes a label;
  wherein the executable code, when executed by the one or more processing devices, further causes the one or more processing devices to:
    obtain a label from the encrypted object; and
    select the remote public key from a plurality of public keys according to the label.

12. The system of claim 11, wherein the label is a hash of the remote public key.

13. The system of claim 11, wherein the remote public key corresponds to a private key of the server system and stored on the server system.

14. The system of claim 11, wherein the executable code, when executed by the one or more processing devices, further causes the one or more processing devices to:
  determine a distance between the local location and the remote location;
  determine a time difference between the local time and the remote time;
  compute a velocity according to the distance and the time difference;
  compare the velocity to a threshold condition; and
  when the threshold condition is met, determine that impossible travel has occurred.

15. The system of claim 11, wherein the executable code, when executed by the one or more processing devices, further causes the one or more processing devices to:
  execute a transaction with respect to an application executing on a first computing device;
  receive a threat assessment from a security component embedded in the application;
  correlate the transaction with the threat assessment; and
  evaluate a security risk according to the threat assessment and attributes of the transaction.

* * * * *